(12) United States Patent
Bowen

(10) Patent No.: US 12,578,724 B2
(45) Date of Patent: Mar. 17, 2026

(54) DETECTION OF ANOMALOUS TRAILER BEHAVIOR

(71) Applicant: Waymo LLC, Mountain View, CA (US)

(72) Inventor: Christopher Bowen, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 364 days.

(21) Appl. No.: 17/542,892

(22) Filed: Dec. 6, 2021

(65) Prior Publication Data

US 2022/0155784 A1    May 19, 2022

Related U.S. Application Data

(63) Continuation of application No. 16/373,741, filed on Apr. 3, 2019, now Pat. No. 11,226,623.

(51) Int. Cl.
G05D 1/00        (2024.01)

(52) U.S. Cl.
CPC ......... G05D 1/0088 (2013.01); G05D 1/0246 (2013.01); G05D 1/0257 (2013.01); G05D 1/0259 (2013.01)

(58) Field of Classification Search
CPC .. G05D 1/0088; G05D 1/0246; G05D 1/0257; G05D 1/0259; G05D 2201/0213
USPC .......................................................... 701/27
See application file for complete search history.

(56) References Cited

U.S. PATENT DOCUMENTS

| | | | |
|---|---|---|---|
| 7,451,020 B2 | 11/2008 | Goetting et al. | |
| 8,275,516 B2 | 9/2012 | Murphy | |
| 9,340,228 B2 | 5/2016 | Xu et al. | |
| 9,558,659 B1 | 1/2017 | Silver et al. | |
| 10,088,845 B2 * | 10/2018 | Pack ................... | G05D 1/0088 |

(Continued)

FOREIGN PATENT DOCUMENTS

| | | |
|---|---|---|
| CN | 102271982 A | 12/2011 |
| CN | 107117176 A | 9/2017 |

(Continued)

OTHER PUBLICATIONS

JP_3299125_B2_I_English Translation (Year: 2002).*

(Continued)

*Primary Examiner* — Fadey S. Jabr
*Assistant Examiner* — Ahmed Alkirsh
(74) *Attorney, Agent, or Firm* — Botos Churchill IP Law LLP

(57) ABSTRACT

The technology relates to determining whether a vehicle operating in an autonomous driving mode is experiencing an anomalous condition, for instance due to a loss of tire pressure, a mechanical failure, or a shift or loss of cargo. The actual current pose of the vehicle is compared to an expected pose of the vehicle, where the expected pose is based on a model of the vehicle. If a pose discrepancy is identified, the anomalous condition is determined from information associated with the pose discrepancy. The vehicle is then able to take corrective action based on the nature of the anomalous condition. The corrective action may include making a real-time driving change, modifying a planned route, alerting a remote operations center, or communicating with one or more other vehicles.

22 Claims, 18 Drawing Sheets

(56)                References Cited

U.S. PATENT DOCUMENTS

| | | | |
|---|---|---|---|
| 10,208,772 | B1 | 2/2019 | Beck |
| 10,571,916 | B2 * | 2/2020 | Tschanz ............... G05D 1/0088 |
| 10,609,340 | B2 | 3/2020 | Aich et al. |
| 10,988,110 | B1 * | 4/2021 | Patnaik ............ G08G 1/096811 |
| 2003/0100986 | A1 | 5/2003 | Lee |
| 2005/0046584 | A1 * | 3/2005 | Breed ................ B60N 2/02246 |
| | | | 340/13.31 |
| 2007/0194017 | A1 | 8/2007 | Markwell |
| 2009/0138191 | A1 | 5/2009 | Engelhard |
| 2009/0306861 | A1 | 12/2009 | Schumann et al. |
| 2011/0178680 | A1 | 7/2011 | Kato et al. |
| 2012/0197478 | A1 | 8/2012 | Niemz |
| 2015/0012165 | A1 | 1/2015 | Israelsson |
| 2015/0165850 | A1 | 6/2015 | Chiu et al. |
| 2016/0351056 | A1 | 12/2016 | Herbach et al. |
| 2017/0203756 | A1 | 7/2017 | Cotgrove |
| 2017/0313233 | A1 * | 11/2017 | Mcnally ................ B60P 7/0861 |
| 2017/0349166 | A1 * | 12/2017 | Anderson ............. B60W 30/02 |
| 2018/0052463 | A1 | 2/2018 | Mays |
| 2018/0096289 | A1 | 4/2018 | Terwilliger et al. |
| 2018/0129222 | A1 | 5/2018 | Anderson et al. |
| 2018/0154881 | A1 | 6/2018 | Heubner et al. |
| 2018/0154888 | A1 | 6/2018 | Buchner et al. |
| 2019/0018412 | A1 * | 1/2019 | Tschanz .............. B60W 60/001 |
| 2019/0172008 | A1 * | 6/2019 | Hage ................... G01R 33/0206 |
| 2019/0210418 | A1 * | 7/2019 | Hall ....................... B60W 30/00 |
| 2019/0235504 | A1 * | 8/2019 | Carter .................. B62D 15/025 |
| 2019/0310636 | A1 * | 10/2019 | Halder ................. G05D 1/0223 |
| 2020/0150686 | A1 | 5/2020 | Wieschemann et al. |
| 2020/0180653 | A1 * | 6/2020 | Chi ........................ B60W 10/04 |
| 2020/0241538 | A1 | 7/2020 | Hansen et al. |
| 2021/0061027 | A1 * | 3/2021 | Da Deppo ............ B60C 23/041 |

FOREIGN PATENT DOCUMENTS

| | | | |
|---|---|---|---|
| CN | 108107891 A | 6/2018 | |
| CN | 108871338 A * | 11/2018 | ............. G01C 21/20 |
| DE | 102017109731 A1 | 11/2018 | |
| JP | 3299125 B2 * | 7/2002 | |
| JP | 3775713 B2 * | 5/2006 | |
| KR | 20180082705 A | 7/2018 | |
| WO | 2018086764 A1 | 5/2018 | |

OTHER PUBLICATIONS

JP_3775713_B2_I_English Translation (Year: 2006).*

International Search Report and Written Opinion for Application No. PCT/US2020/026122 mailed Jul. 10, 2020.

Beyersdorfer , et al., "Novel Model Based Path Planning for Multi-Axle Steered Heavy Load Vehicles", Proceedings of the 16th International IEEE Annual Conference on Intelligent Transportation Systems, Oct. 6-9, 2013, pp. 424-429.

Cariou , et al., "Autonomous Maneuver of a Farm Vehicle with a Trailed Implement: Motion Planner and Lateral- Longitudinal Controllers", 2010 IEEE International Conference on Robotics and Automation, May 3-8, 2010, pp. 3819-3824.

Currier , "A Method for Modeling and Prediction of Ground Vehicle Dynamics and Stability in Autonomous Systems", Thesis, May 6, 2011, 229 pages.

Khalaji , et al., "Robust Adaptive Controller for a Tractor-Trailer Mobile Robot", IEEE/ASME Transactions on Mechatronics, vol. 19, No. 3, Jun. 2014, pp. 943-953.

Li , et al., "Time-Optimal Trajectory Planning for Tractor-Trailer Vehicles via Simultaneous Dynamic Optimization", 2015 IEEE/RSJ International Conference on Intelligent Robots and Systems (IROS), Sep. 28-Oct. 2, 2015, pp. 3844-3849.

Stahn , et al., "Laser Scanner-Based Navigation and Motion Planning for Truck-Trailer Combinations", IEEE, 2007, 6 pages.

Stahn , et al., "Laser Scanner-Based Navigation for Commercial Vehicles", Proceedings of the IEEE Intelligent Vehicles Symposium, Jun. 13-15, 2007, pp. 969-974.

The Extended European Search Report for European Patent Application No. 20783581.0, Nov. 3, 2022, 8 Pages.

First Office Action for Chinese Patent Application No. 202010258005. X, Jan. 19, 2023.

* cited by examiner

100

102

Fig. 2A    200
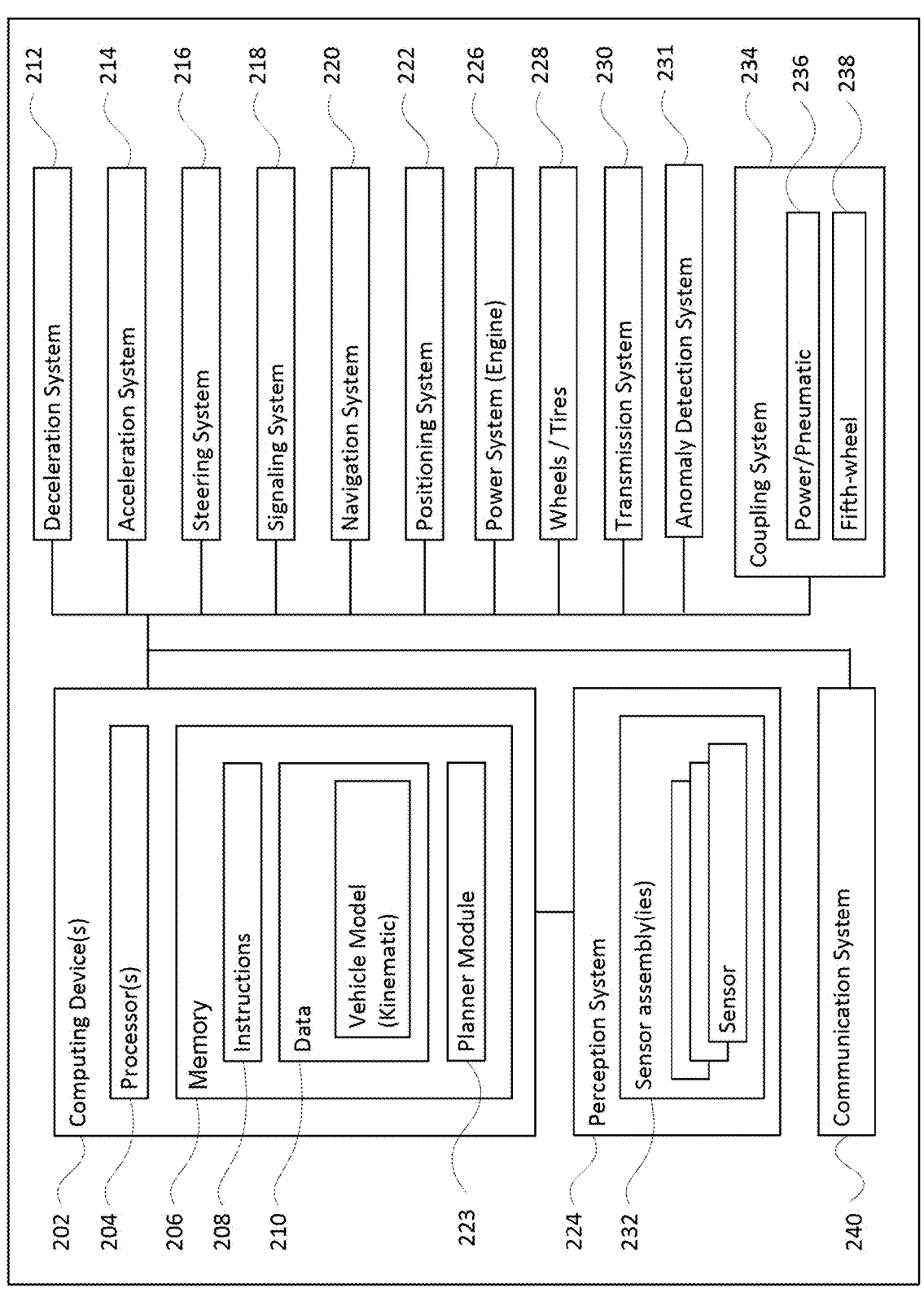

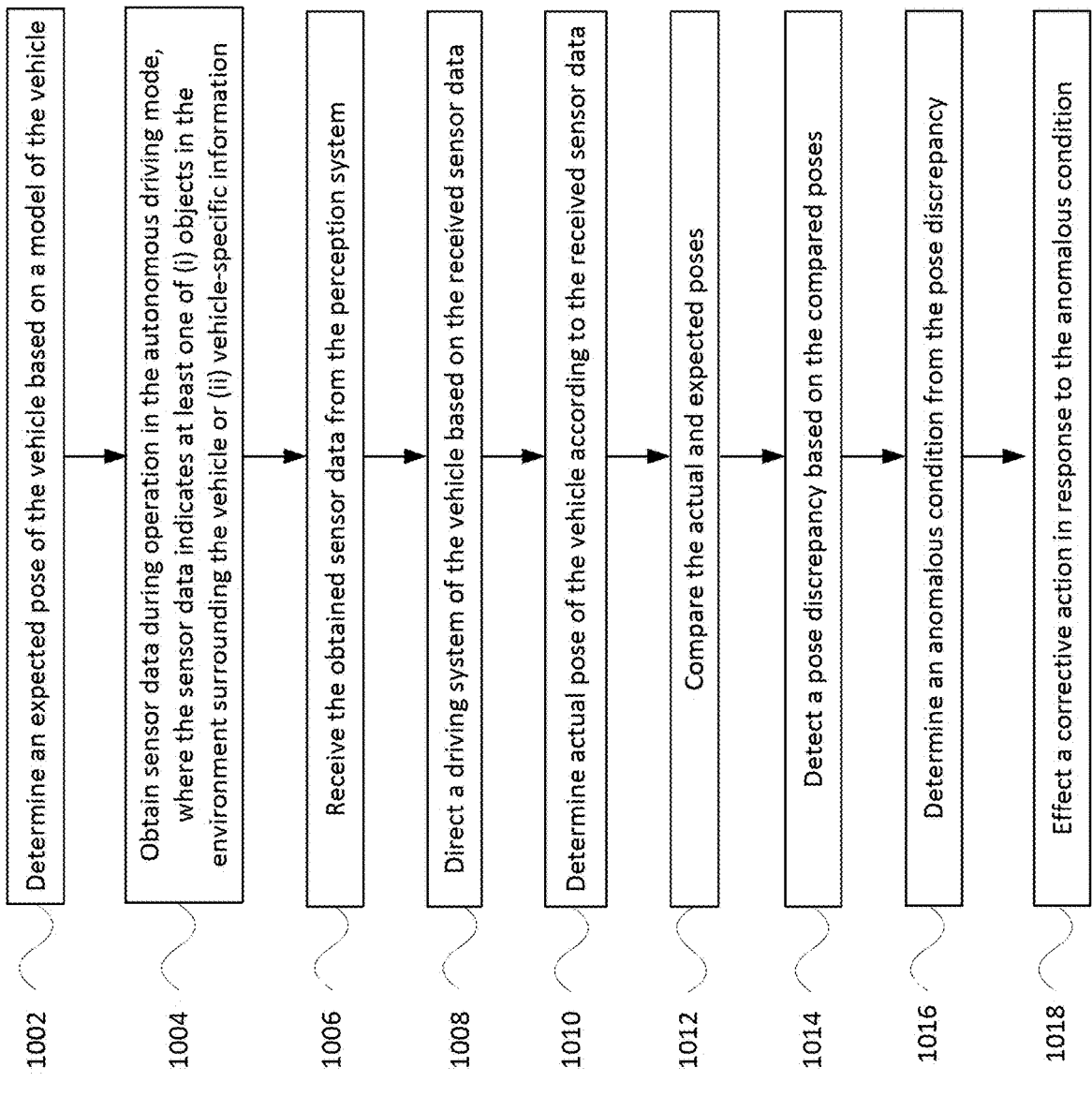

1002   Determine an expected pose of the vehicle based on a model of the vehicle 1004   Obtain sensor data during operation in the autonomous driving mode, where the sensor data indicates at least one of (i) objects in the environment surrounding the vehicle or (ii) vehicle-specific information 1006   Receive the obtained sensor data from the perception system 1008   Direct a driving system of the vehicle based on the received sensor data 1010   Determine actual pose of the vehicle according to the received sensor data 1012   Compare the actual and expected poses 1014   Detect a pose discrepancy based on the compared poses 1016   Determine an anomalous condition from the pose discrepancy 1018   Effect a corrective action in response to the anomalous condition

DETECTION OF ANOMALOUS TRAILER BEHAVIOR

CROSS REFERENCE TO RELATED APPLICATIONS

The present application is a continuation of U.S. patent application Ser. No. 16/373,741, filed Apr. 3, 2019, the entire disclosure of which is incorporated by reference herein.

BACKGROUND

Autonomous vehicles, such as vehicles that do not require a human driver, can be used to aid in the transport of cargo or passengers from one location to another. Such vehicles may operate in a fully autonomous mode, or a partially autonomous mode where a person may provide some driving input. In order to operate in an autonomous mode, the vehicle may employ various on-board sensors to detect features of the external environment, and use received sensor information to perform various driving operations. However, the condition of the vehicle can impact the ability to operate effectively in a self-driving mode.

BRIEF SUMMARY

The technology relates to determining an anomalous condition of a vehicle operating in a self-driving mode, and taking corrective action based on the nature of the anomalous condition. For instance, an anomalous condition for a cargo vehicle may be a problem with the trailer structure, such as a flat tire, or a problem with the cargo itself due to weight distribution or other issues. As discussed below, aspects of the technology include evaluating an expected vehicle pose against a detected pose to identify a pose discrepancy, and determining the anomalous condition from information associated with the pose discrepancy.

According to one aspect of the technology, a vehicle is configured to operate in an autonomous driving mode. The vehicle comprises a driving system, a perception system, and a control system. The driving system includes a steering subsystem, an acceleration subsystem and a deceleration subsystem to control driving of the vehicle in the autonomous driving mode. The perception system includes a plurality of sensors, where each of the plurality of sensors is positioned along the vehicle (either externally or internally). The control system is operatively connected to the driving system and the perception system. The control system has one or more computer processors configured to: determine an expected pose of the vehicle based on a model of the vehicle; receive sensor data from the perception system; direct the driving system when operating in the autonomous driving mode based on the sensor data received from the perception system; compare the received sensor data against the expected pose of the vehicle; detect, based on the comparison between the received sensor data against the expected pose, a pose discrepancy; determine an anomalous condition of the vehicle based on the detected pose discrepancy; and effect a corrective action in response to the anomalous condition.

In one example, the anomalous condition is a flat tire, a component mechanical failure, a shift in cargo, or a loss of cargo. Here, the control system is configured to effect the corrective action in accordance with a type of the cargo.

In another example, the plurality of sensors includes (i) at least one of lidar, radar or a camera sensor, and the vehicle-specific information is pose information; or (ii) at least one of an acoustic sensor or a pressure sensor. In this case, the acoustic sensor is configured to detect audio information of one or more tires of the vehicle, and the pressure sensor is configured to detect either a tire pressure or a load distribution of cargo. The vehicle-specific information may include at least one of acoustical information from the acoustic sensor indicating a tire status or pressure information from the pressure sensor indicating at least one of instantaneous tire pressure or cargo load distribution.

In another example, the vehicle is a truck having a tractor unit, the tractor unit including a coupling system to adjustably couple to a trailer. According to one scenario, the vehicle further includes the trailer. According to another scenario, the detected pose discrepancy is a shift of the trailer from a predicted orientation relative to the tractor unit.

In yet another example, the model of the vehicle is a kinematic model stored in memory of the control system. In a further example, each of the plurality of sensors is configured to detect objects in an environment surrounding the vehicle. And in another example, each of the plurality of sensors is configured to detect vehicle-specific information about the vehicle.

According to another aspect of the technology, a method of operating a vehicle in an autonomous driving mode is provided. The method comprises determining, by one or more processors of the vehicle, an expected pose of the vehicle based on a model of the vehicle; obtaining, by one or more sensors of a perception system of the vehicle, sensor data during operation in the autonomous driving mode; receiving, by the one or more processors, the obtained sensor data from the perception system; directing, by the one or more processors, a driving system of the vehicle based on the received sensor data; determining, by the one or more processors, an actual pose of the vehicle according to the received sensor data; comparing, by the one or more processors, the actual pose with the expected pose; detecting by the one or more processors, based on the comparing actual and expected poses, a pose discrepancy; determining, by the one or more processors, an anomalous condition of the vehicle based on the detected pose discrepancy; and effecting a corrective action in response to the anomalous condition.

In one example, the anomalous condition is a flat tire, a component mechanical failure, a shift in cargo, or a loss of cargo. Here, the effecting the corrective action is either performed in accordance with a type of the cargo, or includes transmitting information regarding the anomalous condition to either another vehicle or to a remote assistance service.

In another example, the vehicle-specific information is pose information. In a further example, obtaining the sensor data includes at least one of detecting audio information of one or more tires of the vehicle or detecting either a tire pressure or a load distribution of cargo. In yet another example, the vehicle-specific information includes at least one of acoustical information indicating a tire status or pressure information indicating at least one of instantaneous tire pressure or cargo load distribution.

According to another example, detecting the pose discrepancy includes detecting a shift of a trailer of the vehicle from a predicted orientation relative to a tractor unit of the vehicle.

In a further example, the model of the vehicle is a kinematic model. In this case, the method may further comprise retrieving the kinematic model from an on-board storage system of the vehicle.

In another example, the sensor data indicates objects in an environment surrounding the vehicle. And in yet another example, the sensor data indicates vehicle-specific information about the vehicle.

BRIEF DESCRIPTION OF THE DRAWINGS

FIGS. 2A-B are block diagrams of systems of an example cargo-type vehicle in accordance with aspects of the technology.

FIG. 10 illustrates an example method in accordance with aspects of the technology.

DETAILED DESCRIPTION

Features of the technology include evaluating actual and expected pose information for a vehicle operating in a self-driving mode, and determining whether an anomalous condition is associated with the vehicle based on any discrepancy between the poses. By way of example only, the anomalous condition may be due to a flat tire, a mechanical failure due to a broken or damaged component (e.g., brakes), shifting or lost cargo, or other factors. Using this information, the vehicle's on-board computer system can take real-time corrective action, modify a planned route, alert a remote operations center, and/or communicate with other vehicles in a fleet.

Example Vehicle Systems

Figures 1A, 1B:
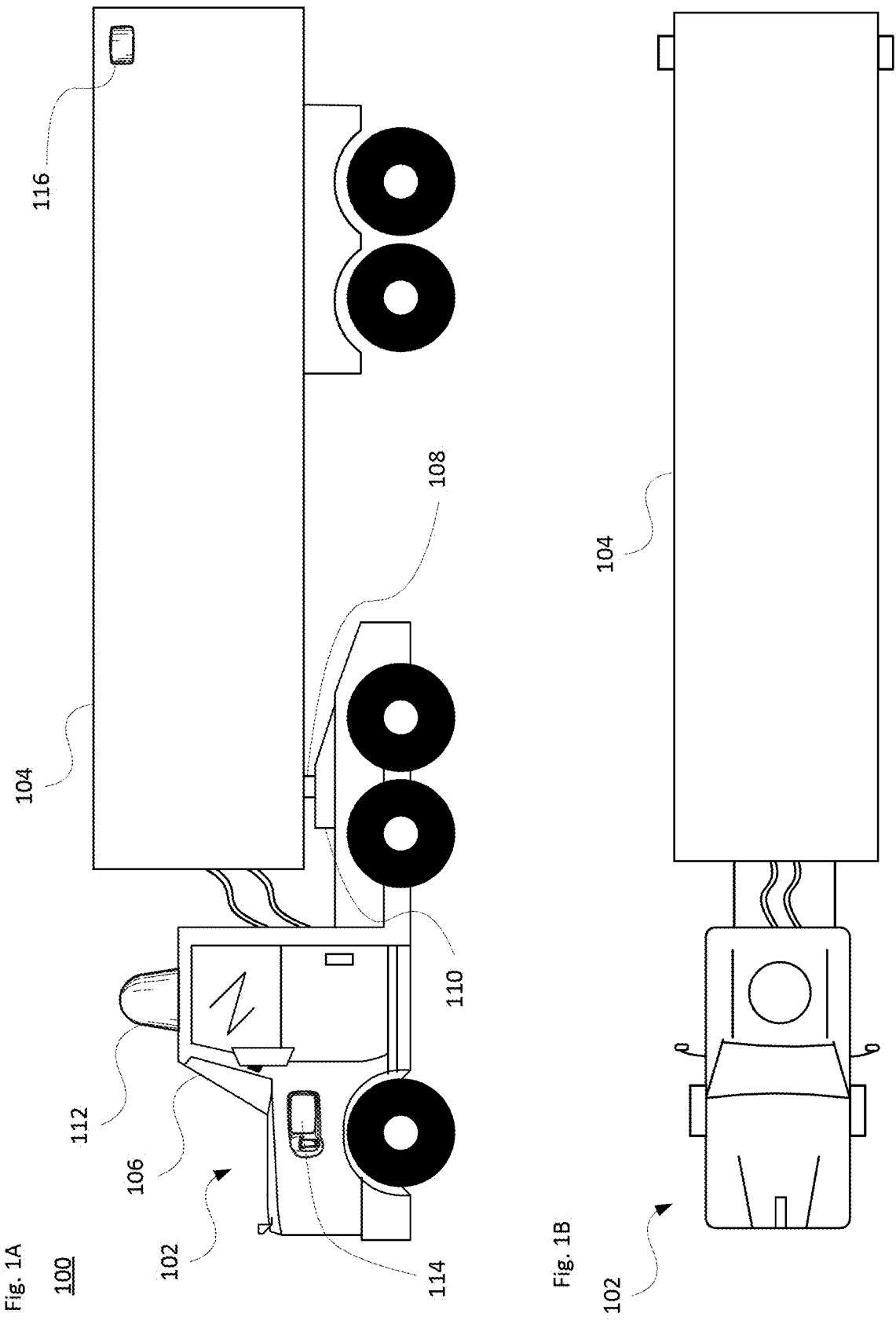
FIGS. 1A-B illustrate an example cargo-type vehicle configured for use with aspects of the technology.

FIGS. 1A-B illustrate an example cargo vehicle 100, such as a tractor-trailer truck. FIG. 1A is a side view and FIG. 1B is a top-down view. The truck may include, e.g., a single, double or triple trailer, or may be another medium or heavy duty truck such as in commercial weight classes 4 through 8. As shown, the truck includes a tractor unit 102 and a single cargo unit or trailer 104. The trailer 104 may be fully enclosed, open such as a flat bed, or partially open depending on the type of cargo to be transported. In this example, the tractor unit 102 includes the engine and steering systems (not shown) and a cab 106 for a driver and any passengers. In a fully autonomous arrangement, the cab 106 may not be equipped with seats or manual driving components, since no person may be necessary.

The trailer 104 includes a hitching point, known as a kingpin, 108. The kingpin 108 is typically formed as a solid steel shaft, which is configured to pivotally attach to the tractor unit 102. In particular, the kingpin 108 attaches to a trailer coupling 110, known as a fifth-wheel, that is mounted rearward of the cab 106. For a double or triple tractor-trailer, the second and/or third trailers may have simple hitch connections to the leading trailer. Or, alternatively, each trailer may have its own kingpin. In this case, at least the first and second trailers could include a fifth-wheel type structure arranged to couple to the next trailer.

As shown, the tractor and/or trailer may have one or more sensor units 112, 114 and 116 disposed therealong. For instance, one or more sensor units 112 may be disposed on a roof or top portion of the cab 106, and one or more side sensor units 114 may be disposed, e.g., on left and/or right sides of the cab 106. In some cases, such sensor units may be located on the top of, on the bottom of, adjacent to, or in place of rear-view mirrors. Sensor units may also be located along other regions of the cab 106, such as along the front bumper or hood area, in the rear of the cab adjacent to the fifth-wheel, underneath the chassis, etc. The trailer 104 may also have one or more sensor units 116 disposed therealong, for instance along a side panel, front, rear, roof and/or undercarriage of the trailer 104.

By way of example, each sensor unit may include one or more sensors, such as lidar, radar, camera (e.g., optical or infrared), acoustical (e.g., microphone or sonar-type sensor), pressure (e.g., piezoelectric or mechanical), inertial (e.g., accelerometer, gyroscope, etc.) or other sensors (e.g., positioning sensors such as GPS sensors). Acoustical sensors near the tires (e.g., on the vehicle chassis near the axles or wheel wells) can detect the sounds of the tires as the vehicle drives autonomously along the roadway. A change in sound may indicate a different road surface type, a flat or under-pressurized tire or other circumstance. Pressure sensors could be used to detect instantaneous tire pressure or the weight distribution of cargo. While certain aspects of the disclosure may be particularly useful in connection with specific types of vehicles, the vehicle may be any type of vehicle including, but not limited to, trucks and other cargo vehicles, buses, cars, motorcycles, recreational vehicles, etc.

There are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. Level 2 has partial automation of certain driving operations, while Level 3 involves conditional automation that can enable a person in the driver's seat to take control as warranted. In contrast, Level 4 is a high automation level where the vehicle is able to drive without assistance in select conditions. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as autonomous driving modes. Thus, reference to an autonomous driving mode can include both partial and full autonomy.

FIG. 2A illustrates a block diagram 200 with various components and systems of an exemplary vehicle, such as cargo vehicle 100, to operate in an autonomous driving mode. As shown, the block diagram 200 includes a control system having one or more computing devices 202. The control system may constitute an electronic control unit (ECU) of a tractor unit of the cargo vehicle 100. The computing devices 202 contain one or more processors 204, memory 206 and other components typically present in general purpose computing devices. The memory 206 stores information accessible by the one or more processors 204, including instructions 208 and data 210 that may be executed or otherwise used by the processor(s) 204. For instance, the data 210 may include a model of the vehicle, such as a kinematic model for both the tractor and trailer(s). The computing system is able to control overall operation of the vehicle when operating in an autonomous driving mode according to the vehicle model.

The memory 206 stores information accessible by the processors 204, including instructions 208 and data 210 that may be executed or otherwise used by the processors 204. The memory 206 may be of any type capable of storing information accessible by the processor, including a computing device-readable medium. The memory is a non-transitory medium such as a hard-drive, memory card, optical disk, solid-state, etc. Systems may include different combinations of the foregoing, whereby different portions of the instructions and data are stored on different types of media.

The instructions 208 may be any set of instructions to be executed directly (such as machine code) or indirectly (such as scripts) by the processor. For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance. The data 210 may be retrieved, stored or modified by one or more processors 204 in accordance with the instructions 208. In one example, some or all of the memory 206 may be an event data recorder or other secure data storage system configured to store vehicle diagnostics, detected sensor data, per-vehicle calibration parameters, and/or per-trailer calibration parameters, which may be on board the vehicle or remote, depending on the implementation.

The processors 204 may be commercially available CPUs. Alternatively, each processor may be a dedicated device such as an ASIC or other hardware-based processor. Although FIG. 2A functionally illustrates the processors, memory, and other elements of computing devices 202 as being within the same block, such devices may actually include multiple processors, computing devices, or memories that may or may not be stored within the same physical housing. Similarly, the memory 206 may be a hard drive or other storage media located in a housing different from that of the processor(s) 204. Accordingly, references to a processor or computing device will be understood to include references to a collection of processors or computing devices or memories that may or may not operate in parallel.

In one example, the computing devices 202 may form an autonomous driving computing system incorporated into vehicle 100. The autonomous driving computing system may capable of communicating with various components of the vehicle. For example, the computing devices 202 may be in communication with various systems of the vehicle, such as a driving system including a deceleration system 212 (for controlling braking of the vehicle), acceleration system 214 (for controlling acceleration of the vehicle), steering system 216 (for controlling the orientation of the wheels and direction of the vehicle), signaling system 218 (for controlling turn signals), navigation system 220 (for navigating the vehicle to a location or around objects) and a positioning system 222 (for determining the position of the vehicle, e.g., including the vehicle's pose). The autonomous driving computing system may employ a planner module 223, in accordance with the navigation system 220, the positioning system 222 and/or other components of the system, e.g., for determining a route from a starting point to a destination, for selecting an intermediate section of the route, or for making modifications to various driving aspects in view of current or expected environmental conditions along the route.

The computing devices 202 are also operatively coupled to a perception system 224 (for detecting objects in the vehicle's environment), a power system 226 (for example, a battery and/or gas or diesel powered engine) and a transmission system 230 in order to control the movement, speed, etc., of the vehicle in accordance with the instructions 208 of memory 206 in an autonomous driving mode which does not require or need continuous or periodic input from a passenger of the vehicle. Some or all of the wheels/tires 228 are coupled to the transmission system 230, and the computing devices 202 may be able to receive information about tire pressure, balance and other factors that may impact driving in an autonomous mode. While anomaly detection may be performed by computing devices 202 and/or perception system 224, it may alternatively be performed on a separate component, such as an anomaly detection system 231. The anomaly detection system may include one or more processors (not shown).

The computing devices 202 may control the direction and speed of the vehicle, e.g., via the planner module 223, by controlling various components. By way of example, computing devices 202 may navigate the vehicle to a destination location completely autonomously using data from map information and the navigation system 220. Computing devices 202 may use the positioning system 222 to determine the vehicle's location and the perception system 224 to detect and respond to objects when needed to reach the location safely. In order to do so, computing devices 202 may cause the vehicle to accelerate (e.g., by increasing fuel or other energy provided to the engine by acceleration system 214), decelerate (e.g., by decreasing the fuel supplied to the engine, changing gears, and/or by applying brakes by deceleration system 212), change direction (e.g., by turning the front or other wheels of vehicle 100 by steering system 216), and signal such changes (e.g., by lighting turn signals of signaling system 218). Thus, the acceleration system 214 and deceleration system 212 may be a part of a drivetrain or other type of transmission system 230 that includes various components between an engine of the vehicle and the wheels of the vehicle. Again, by controlling these systems, computing devices 202 may also control the transmission system 230 of the vehicle in order to maneuver the vehicle autonomously.

Navigation system 220 may be used by computing devices 202 in order to determine and follow a route to a location. In this regard, the navigation system 220 and/or memory 206 may store map information, e.g., highly detailed maps that computing devices 202 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and/or right lane lines or other lane markers that define the boundary of the lane. Thus, most lanes may be bounded by a left edge of one lane line and a right edge of another lane line.

The perception system 224 includes one or more sensor assemblies 232 for detecting objects external to the vehicle. The detected objects may be other vehicles, obstacles in the roadway, traffic signals, signs, trees, etc. By way of example only, the sensor assemblies 232 of the perception system 224 may each include one or more light detection and ranging (lidar) sensors, radar units, cameras (e.g., optical imaging devices, with or without a neutral-density filter (ND) filter), positioning sensors (e.g., gyroscopes, accelerometers and/or other inertial components), infrared sensors, acoustical sensors (e.g., microphones or sonar transducers), and/or any other detection devices that record data which may be processed by computing devices 202. Such sensors of the perception system 224 may detect objects outside of the vehicle and their characteristics such as location, orientation, size, shape, type (for instance, vehicle, pedestrian, bicyclist, etc.), heading, speed of movement relative to the vehicle, etc. In addition, the sensors may detect road conditions, like standing water, ice, or potholes.

The perception system 224 may also include other sensors within the vehicle to detect objects and conditions within the vehicle, such as in the trailer or passenger compartment. For instance, such sensors may detect, e.g., cargo, passengers, pets, etc., as well as conditions within the vehicle or a component thereof, and/or outside the vehicle such as temperature, humidity, etc. Still further, sensors of the perception system 224 may measure the rate of rotation of the wheels 228, an amount or a type of braking by the deceleration system 312, pressure, alignment and other factors associated with the equipment of the vehicle itself. Depending on the vehicle configuration, the longitudinal position of the kingpin of the tractor may be adjustable. One or more sensors may be arranged to detect the specific longitudinal position of the kingpin.

The raw data from the sensors and the aforementioned characteristics can be processed by the perception system 224 and/or sent for further processing to the computing devices 202 periodically or continuously as the data is generated by the perception system 224. Computing devices 202 may use the positioning system 222 to determine the vehicle's location and perception system 224 to detect and respond to objects when needed to reach the location safely, e.g., via adjustments made by planner module 223. In addition, the computing devices 202 may perform calibration of individual sensors, all sensors in a particular sensor assembly, or between sensors in different sensor assemblies or other physical housings.

As noted above, one or more sensors of the perception system 224 may be incorporated into sensor assemblies or housings. In one example, these may be integrated into the side-view mirrors on the vehicle, e.g., as sensor towers integrated into the side-view mirrors on the truck, farm equipment, construction equipment or the like. In another example, other sensors may be part of the roof-top housing 112, or other sensor housings or units 114 and/or 116. The computing devices 202 may communicate with the sensor assemblies located on or otherwise distributed along the vehicle. Sensor assemblies 232 may also be positioned at different locations on the tractor unit 102 or on the trailer 104, as noted above with regard to FIGS. 1A-B. The computing devices 202 may communicate with the sensor assemblies located on both the tractor unit 102 and the trailer 104. Each assembly may have one or more types of sensors such as those described above.

Also shown in FIG. 2A is a coupling system 234 for connectivity between the tractor unit and the trailer. The coupling system 234 may include one or more power and/or pneumatic connections 236 and a fifth-wheel 238 at the tractor unit for connection to the kingpin of the trailer.

A communication system 240 is also shown as part of vehicle system 200. For instance, the communication system 240 may also include one or more wireless configurations to facilitate communication with other computing devices, such as passenger computing devices within the vehicle, computing devices external to the vehicle such as in another nearby vehicle on the roadway, and/or a remote server system. Such connections may include short range communication protocols such as Bluetooth™, Bluetooth™ low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Figure 2B:
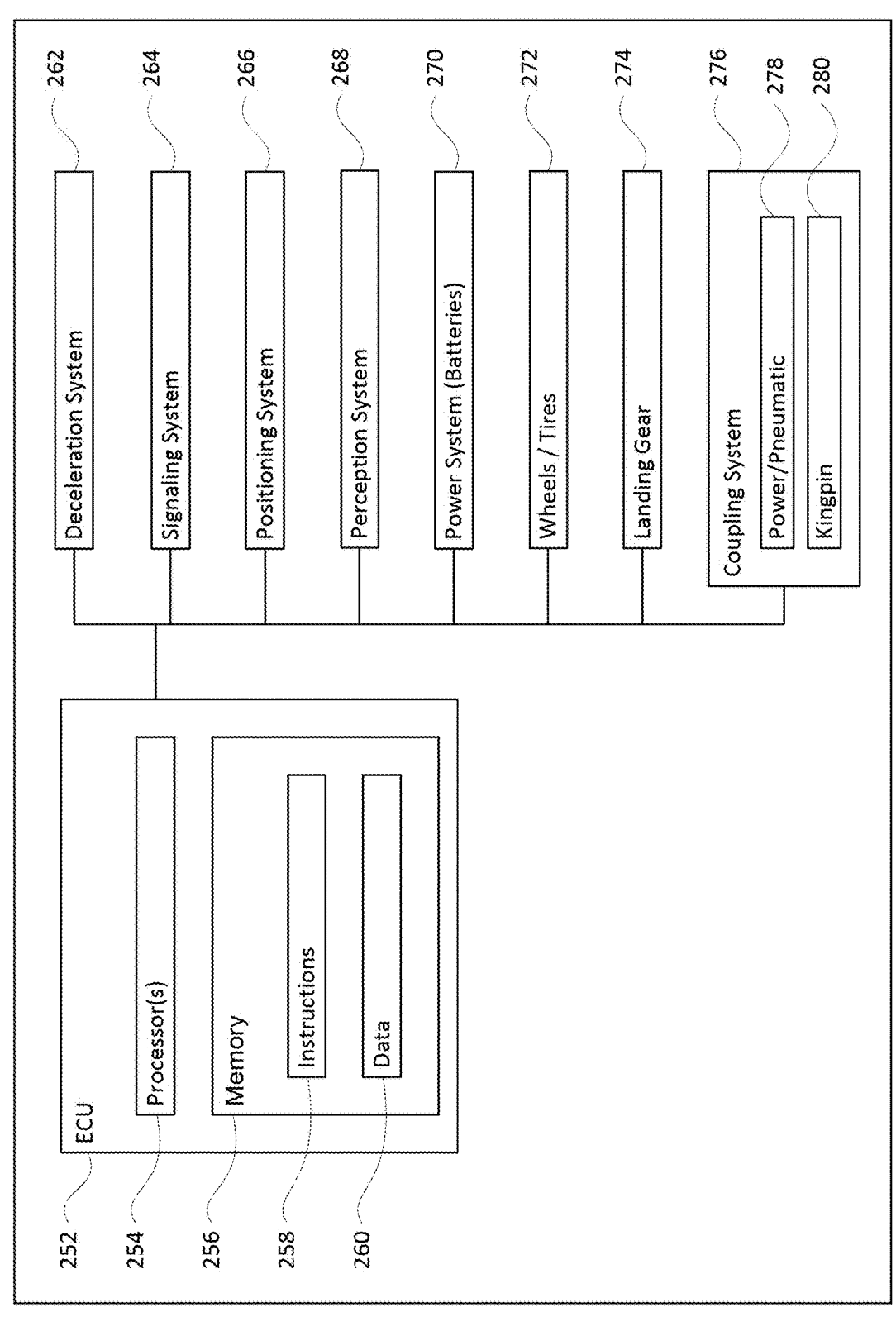

FIG. 2B illustrates an example block diagram 250 of trailer-based subsystems, such as might be included in trailer 104 of FIGS. 1A-B. As shown, the system includes an ECU 252 of one or more computing devices, such as computing devices containing one or more processors 254, memory 256 and other components typically present in general purpose computing devices. The memory 256 stores information accessible by the one or more processors 254, including instructions 258 and data 260 that may be executed or otherwise used by the processor(s) 254. The descriptions of the processors, memory, instructions and data from FIG. 2A apply to these elements of FIG. 2B.

The ECU 252 is configured to receive information and control signals from the trailer unit. The on-board processors 254 of the ECU 252 may communicate with various systems of the trailer, including a deceleration system 262, signaling system 264, and a positioning system 266. The ECU 252 may also be operatively coupled to a perception system 268 with one or more sensors for detecting objects in the trailer's environment and a power system 270 (for example, a battery power supply) to provide power to local components. Some or all of the wheels/tires 272 of the trailer may be coupled to the deceleration system 262, and the processors 254 may be able to receive information about tire pressure, balance, temperature, wheel speed and other factors that may impact driving in an autonomous mode, and to relay that information to the processing system of the tractor unit. The deceleration system 262, signaling system 264, positioning system 266, perception system 268, power system 270 and wheels/tires 272 may operate in a manner such as described above with regard to FIG. 2A.

The trailer also includes a set of landing gear 274 as well as a coupling system 276. The landing gear provide a support structure for the trailer when decoupled from the tractor unit. The coupling system 276, which may be a part of coupling system 234, provides connectivity between the trailer and the tractor unit. Thus, the coupling system 276 may include a connection section 278 (e.g., for power and/or pneumatic links). As shown, the coupling system 276 also includes a kingpin 280 configured for connectivity with the fifth-wheel of the tractor unit.

Example Implementations

In view of the structures and configurations described above and illustrated in the figures, various aspects will now be described in accordance with aspects of the technology.

As noted above, various sensors may be located at different places around the vehicle (see FIGS. 1A-B) to gather data from different parts of the external environment and/or the vehicle itself. Certain sensors may have different fields of view (FOV) of the external environment depending on their placement around the vehicle and the type of information they are designed to gather. For instance, different lidar sensors may be used for near (short range) detection of objects adjacent to the vehicle (e.g., less than 2-10 meters), while others may be used for far (long range) detection of objects a hundred meters (or more or less) in front of the vehicle. Mid-range lidars may also be employed. Multiple radar units may be positioned toward the front or rear of the vehicle for long-range object detection. And cameras may be arranged to provide good visibility around the vehicle. Depending on the configuration, certain types of sensors may include multiple individual sensors with overlapping fields of view. Alternatively or additionally, other sensors may provide redundant 360° fields of view. In addition to detecting objects in the environment external to the vehicle, these sensors may be used to determine the vehicle's actual pose including, e.g., the orientation of the trailer to the tractor unit of a cargo vehicle.

Figure 3:
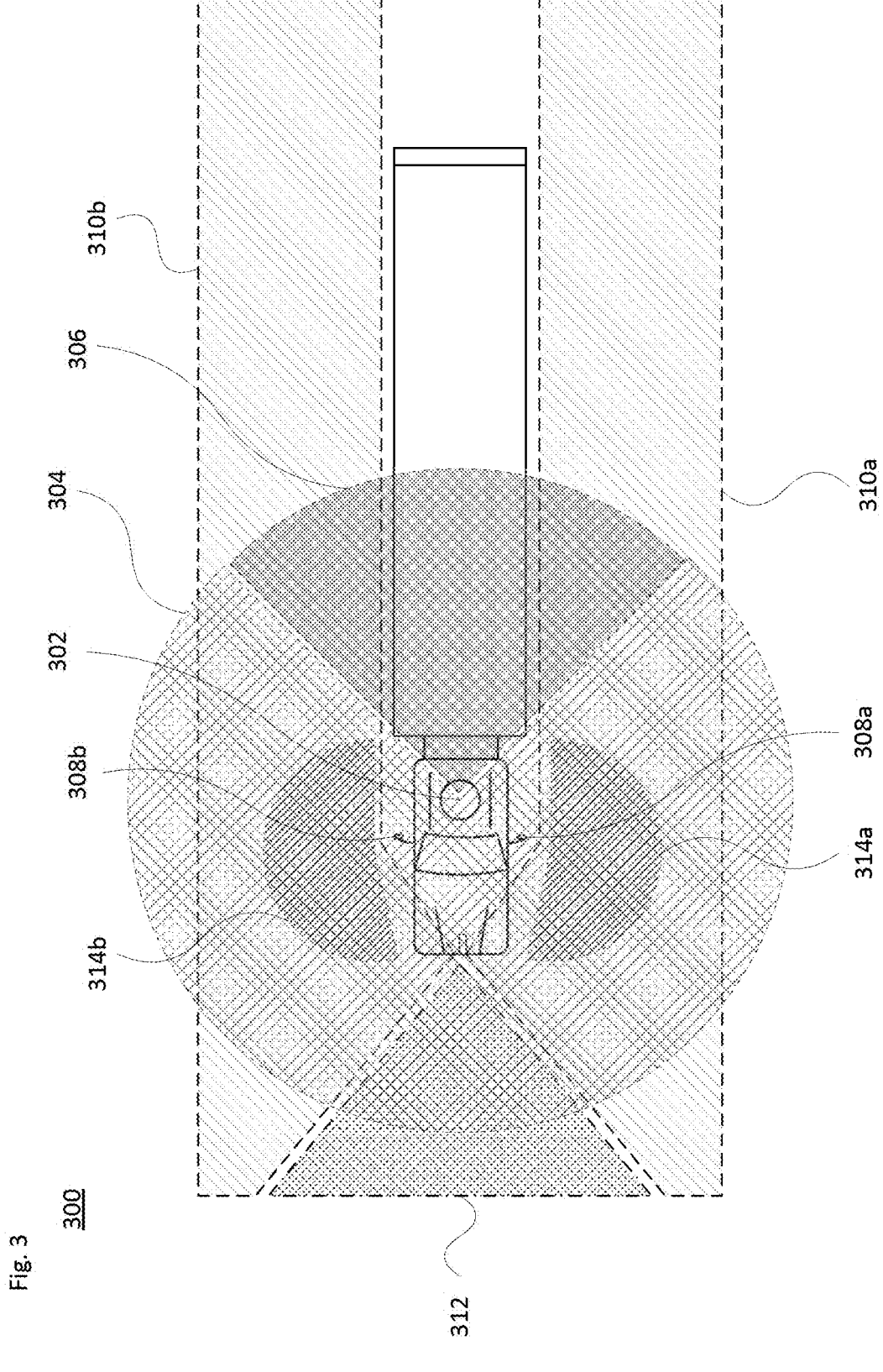
FIG. 3 illustrates example sensor fields of view for a cargo-type vehicle in accordance with aspects of the disclosure.

FIG. 3 provides one example 300 of sensor fields of view relating to the sensors, such as those illustrated in FIG. 1B. As illustrated in example 300 of FIG. 3, the lidar(s) in the rooftop sensor housing 302 may have a FOV 304. Here, as shown by region 306, the trailer or other articulating portion of the vehicle may provide signal returns, and may partially or fully block a rearward view of the external environment. Long range lidars on the left and right sides 308a, 308b of the tractor unit have FOVs 310a and 310b. These can encompass significant areas along the sides and front of the vehicle. As shown, there may be an overlap region 312 of their fields of view in front of the vehicle. The overlap region 312 provides the perception system with additional or information about a very important region that is directly in front of the tractor unit. This redundancy also has a safety aspect. Should one of the long range lidar sensors suffer degradation in performance, the redundancy would still allow for operation in an autonomous mode. Short range lidars on the left and right sides of the vehicle have smaller FOVs 314a and 314b. Both types of lidars may be co-located in a single housing. A space is shown between different fields of view for clarity in the drawing; however, in actuality there may be no break in the coverage. The specific placements of the sensor assemblies and fields of view is merely exemplary, and may different depending on, e.g., the type of vehicle, the size of the vehicle, FOV requirements, etc.

Example Scenarios

As noted above, aspects of the technology involve evaluating actual and expected information about the vehicle relative to its external environment to determine an anomalous operating condition. The cause may be a flat tire, a mechanical failure, cargo loss or shifting, or some other reason. This information may be used to manage or alter current driving operations. It may also be used to modify or re-plan an upcoming portion of the route, and also to inform a remote facility of the situation and the potential need for vehicle repairs.

Large self-driving vehicles, such as tractor-trailer trucks and other cargo vehicles, may be more susceptible to anomalous issues such as flat tires and shifting cargo than smaller vehicles such as sedans and minivans. Movement of the trailer or the large vehicle as a whole can depend on weight distribution and/or where a flat tire is located along the vehicle. Thus, determining that there is an anomalous condition and what that condition entails could have a significant impact on how to operate the vehicle as safely as possible, and to potentially alert other vehicles or a remote assistance service as well.

As illustrated in FIG. 2A, the on-board computing system may store a vehicle model, such as a kinematic or dynamic model of the tractor-trailer vehicle. A kinematic model is a geometric model, and can be used to predict or describe vehicle motion in a speed-invariant way. However, a dynamics model may be employed, for instance to consider factors that depend on speed (e.g., drag and slip). The vehicle model can be calibrated to account for real-world conditions and driving situations. For instance, it may factor in road shape (e.g., straight or curved), incline or decline angle, surface type (e.g., asphalt, concrete or gravel), potholes, etc. The positional relationship of the tractor unit and the trailer to one another is part of the model. For enhanced accuracy, the vehicle model may be calibrated on a per-vehicle or a per-trailer basis. The vehicle model may be employed by a planning subsystem, such as planner module 223 of FIG. 2A, when selecting a driving route and otherwise controlling the vehicle in an autonomous driving mode. It may also be employed by another part of the computing system, for instance when taking corrective action (e.g., emergency braking or lane shifting to avoid an obstacle).

The system employs the vehicle model to determine an expected pose of the vehicle at a particular point in time along a region of the roadway. The perception system of the tractor unit and/or trailer is used to detect the vehicle's actual pose at the particular point in time along the region of the roadway. The detected information, including the vehicle's pose and its location along the roadway, can be compared against what is expected based on the vehicle model. If the expectation based on the model does not match the detected information or deviates beyond some threshold amount, then various techniques can be used to determine the cause of the deviation in vehicle behavior and whether there is an anomalous condition. In response to this, the on-board computer system may cause corrective action to be taken.

A heuristic or a machine learning (ML) model can be employed by the on-board system to determine the cause of the behavior. An example of a specific heuristic would be to keep a history of other similar types of self-driving vehicles on the same road under similar conditions (e.g., rain, wind, trailer load, etc.), and determine from these how much variation can be expected relative to a nominal vehicle model. The system could then check if the actual trailer position exceeds this variation by some fixed threshold A (e.g., 2-20 centimeters, or more or less) that persists over some fixed time interval (e.g., at least 0.5-5 seconds) to avoid false positives due to transient road conditions like potholes or bumps.

Another approach would be to learn parameters of a kinematic or dynamic model of the trailer online during system operation, such as in an autonomous driving mode. This model would be scenario dependent, factoring in road conditions, weather, and/or trailer load, etc. This model can also include the expected variation expressed as noise in the motion, for instance employing a continuous-time stochastic process (e.g., a Wiener process). In this case, the system could treat the problem of determining if there is anomaly as a hypothesis test. One approach is to use a p-value threshold, which would correspond to testing if the actual trailer motion exceeds the variation predicted by the model by a distance dependent on the estimated normal variation.

The vehicle model may be obtained using a distributed data gathering process. For instance, driving data from an entire fleet of vehicles operating autonomously and/or manually could be employed to train a model off-board and not in real time. Here, the system could compare the sensor data from any given vehicle against this model to detect anomalies. Once it is determined that an anomaly occurred, the system could compare the data from the current vehicle of interest against anomalies previously observed on other vehicles to identify the nature of the anomaly and determine the correct response. To continually collect the training examples, sensor logs from each vehicle might be transmitted to one or more central servers in real-time or uploaded in bulk at specific locations, so that it may be collated and processed. This processing might be entirely automatic or involve some manual identification of situations of interest. The output of the process would be a dynamics model estimated from all this data. In one scenario, the model could be used onboard each vehicle, where it would be employed to predict the likely motion of the vehicle and trailer (and ideally its own uncertainty) based on any one, combination, or all of the following inputs:

a) the controls commanded on the vehicle,
b) the sensor data (e.g., speed, road conditions, weather, and location),
c) vehicle-specific calibration parameters,
d) the history in a long short-term memory (LSTM) or similar model (to allow detection of longer-term anomalies).

A similar approach could be taken for learning a model that could identify exactly what anomaly occurred. For this, the sensor logs would be collected when an anomaly occurs and labeled based on the nature of anomaly. The inputs to the learning model would be the same as above plus the observed motion of the vehicle and trailer, and the output would now be the likely nature and severity of the anomaly. Other variations on this general scheme exist. For example, one could train a single model that both simultaneously predicts both when and what type of anomaly occurred. Or instead of determining cause and severity, the model could directly output the appropriate response from a predefined set of options. Furthermore, a lightweight model could quickly and cheaply determine when it is appropriate to defer to a more expensive (e.g., resource intensive), possibly off-board, model for full processing.

It may also be helpful to quantify how accurate the vehicle model is in different situations. This will help the system detect when a vehicle encounters an anomaly rather than just a situation where the model may be inaccurate. The system could quantify how accurate the model is statistically, for example with a set of confidence intervals or other values. Alternatively or in addition, the accuracy may be evaluated heuristically. For example, if it is determined that the model has a relatively low accuracy on wet slopes, the system may make a determination to ignore or discount larger discrepancies in such situations.

Figure 4A:
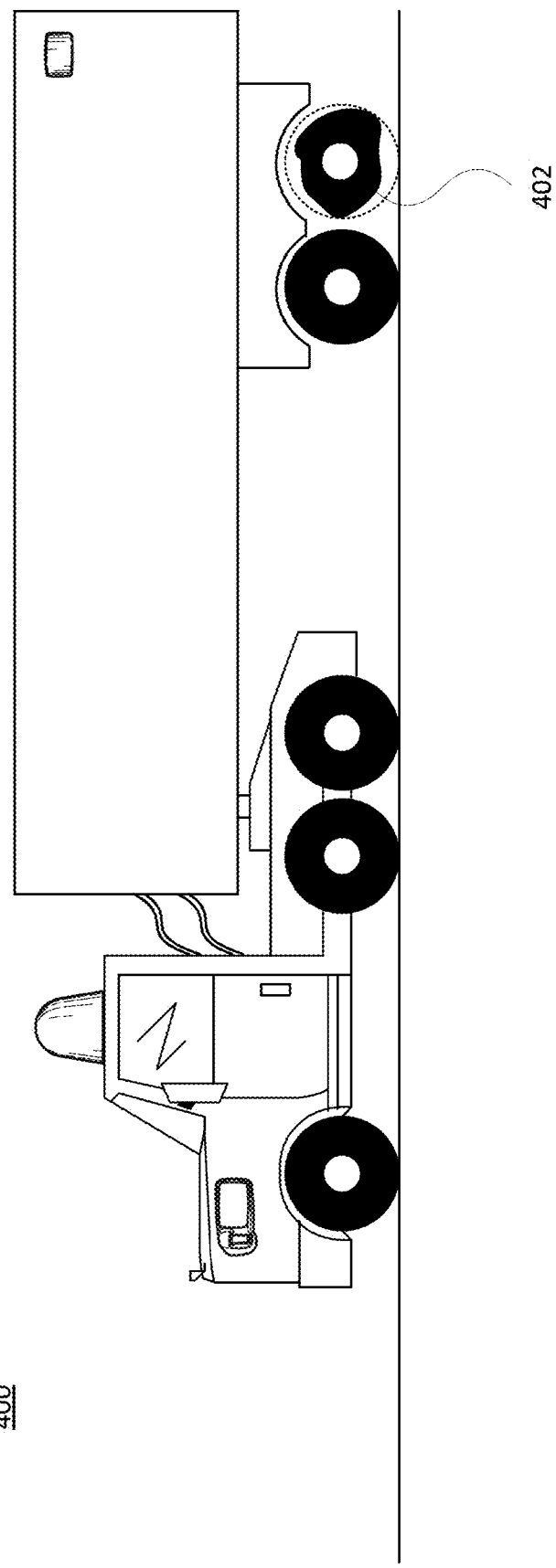
FIGS. 4A-C illustrate an example low tire pressure scenario in accordance with aspects of the technology.
Figure 4B:
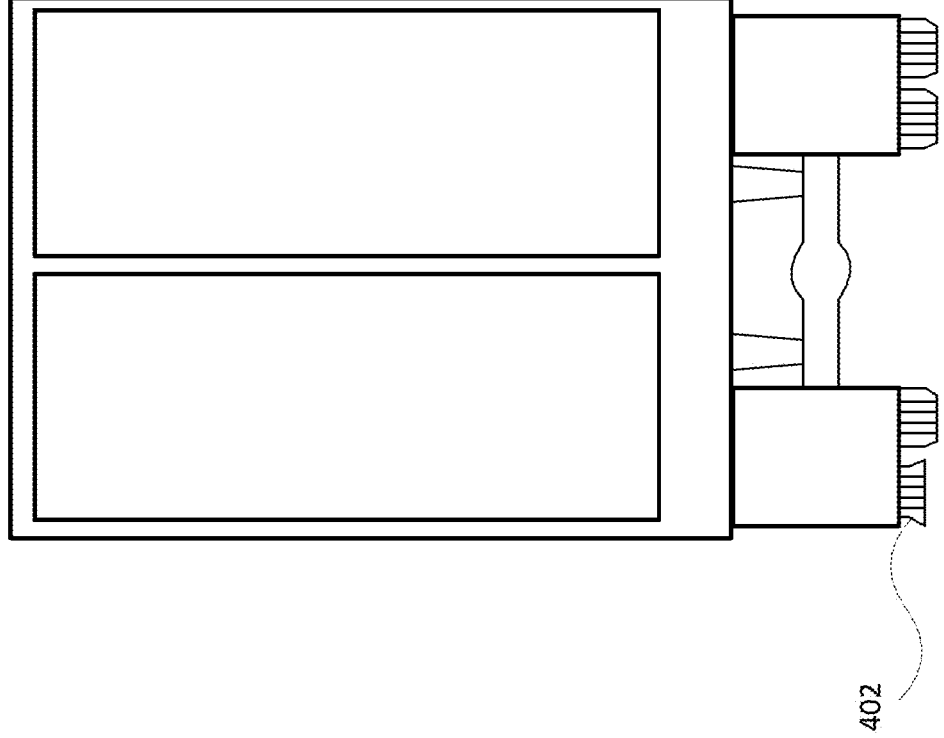
Figure 4C:
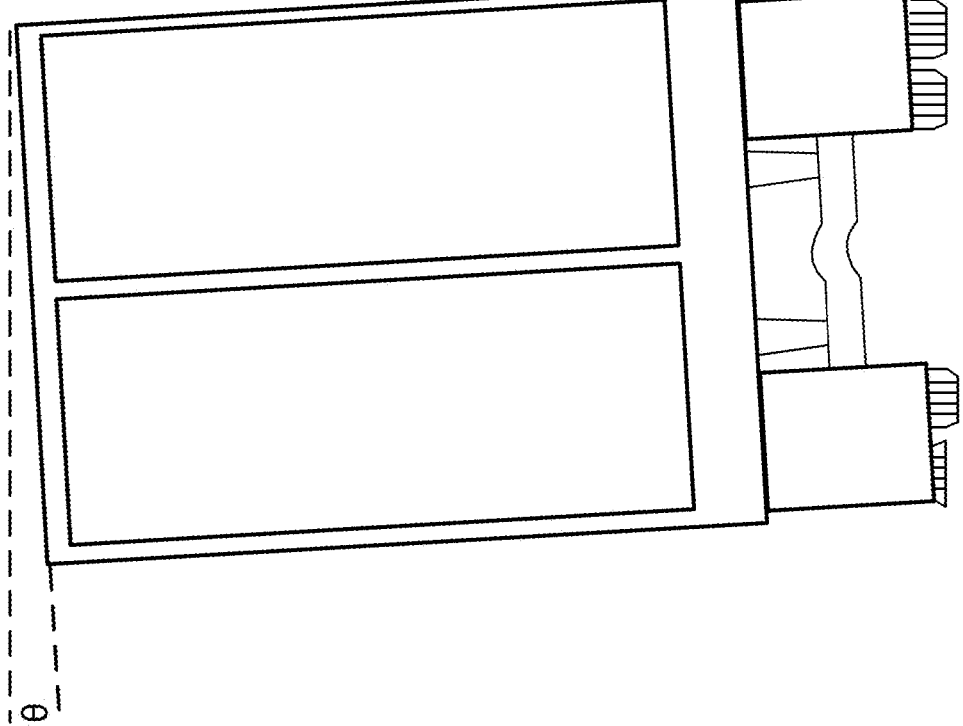

One anomalous behavior scenario that can benefit from such analysis involves a flat tire, or a tire with low pressurization. FIGS. 4A-C illustrate one example 400 with a flat tire 402. As shown in FIGS. 4A-B, the tire that is flat is a rear tire located on the left side of the cargo vehicle. FIG. 4C is an exaggerated view showing how the trailer may tilt to the side of the flat tire at an angle (θ), which may be on the order of 1-5°, or more or less. In one scenario, if this angle exceeds a threshold A, than corrective action may be taken.

For instance, the partial or complete loss of tire pressure might result in a sudden shift in the vehicle's motion, followed by possible drifting with some lateral bias as a result of a flat on the left or right side of the vehicle. This could be on the order of a few centimeters to 10-20 centimeters or more or less. The amount of discrepancy from the predicted or estimated pose that would be significant enough to warrant corrective action can depend on a few factors. For instance, how much variation (A) does the system expect under the current environmental conditions? If the road surface is wet, more variation may be expected. Another factor is how accurate is the actual detected trailer pose? This can be impacted by the number, type and placement of sensors, as well as their respective accuracies. Yet another factor is the expected cost of corrective action. By way of example, if there is a camera positioned such that it might be able to see the problem, the system might be able to transmit one or more short videos to a remote assistance service to evaluate the situation. Depending on the results of the evaluation, corrective action could be taken or deferred until the vehicle arrives at its intended destination or a service facility. However, if it is not possible to obtain a real time or near real time response, the on-board system may choose what action to take. Alternatively, an immediate pullover or change in route may be appropriate if a pose variation exceeds a default threshold (e.g., more than 10 centimeters of lateral variance, or more or less). For instance, if the vehicle determines that the trailer is behaving outside of the nominal range, it could alter the route to avoid steep inclines or high curvature roads to better maintain safety margins.

In this scenario, should the on-board computer system determine that the shift or drift is adversely affecting a current driving operation or would likely affect upcoming operations, the system may cause the vehicle to slow down, change lanes, pull over immediately, detour to a service area, or take some other action.

Figure 5A:
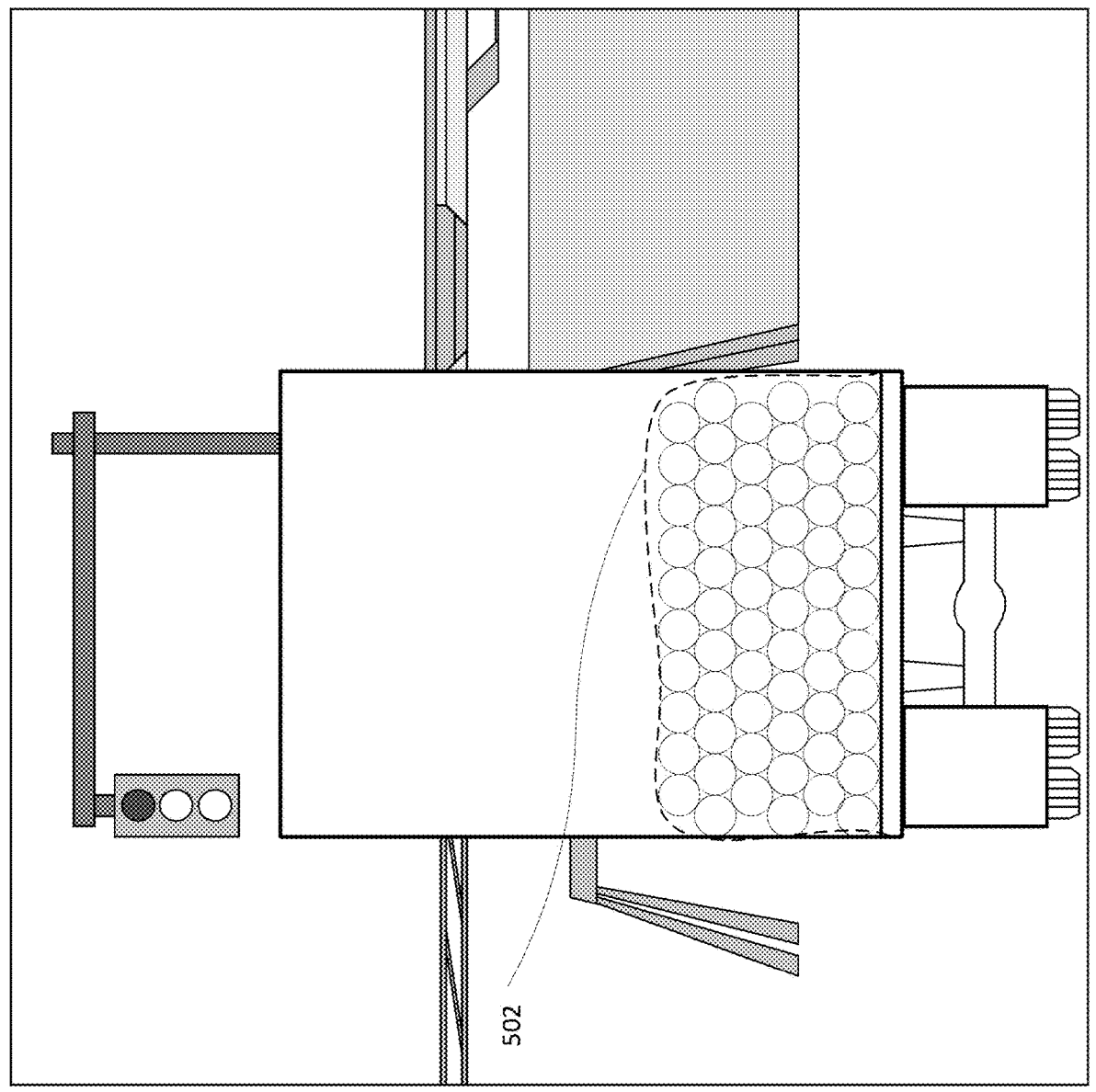
FIGS. 5A-B illustrate an example cargo loss scenario in accordance with aspects of the technology.
Figure 5B:
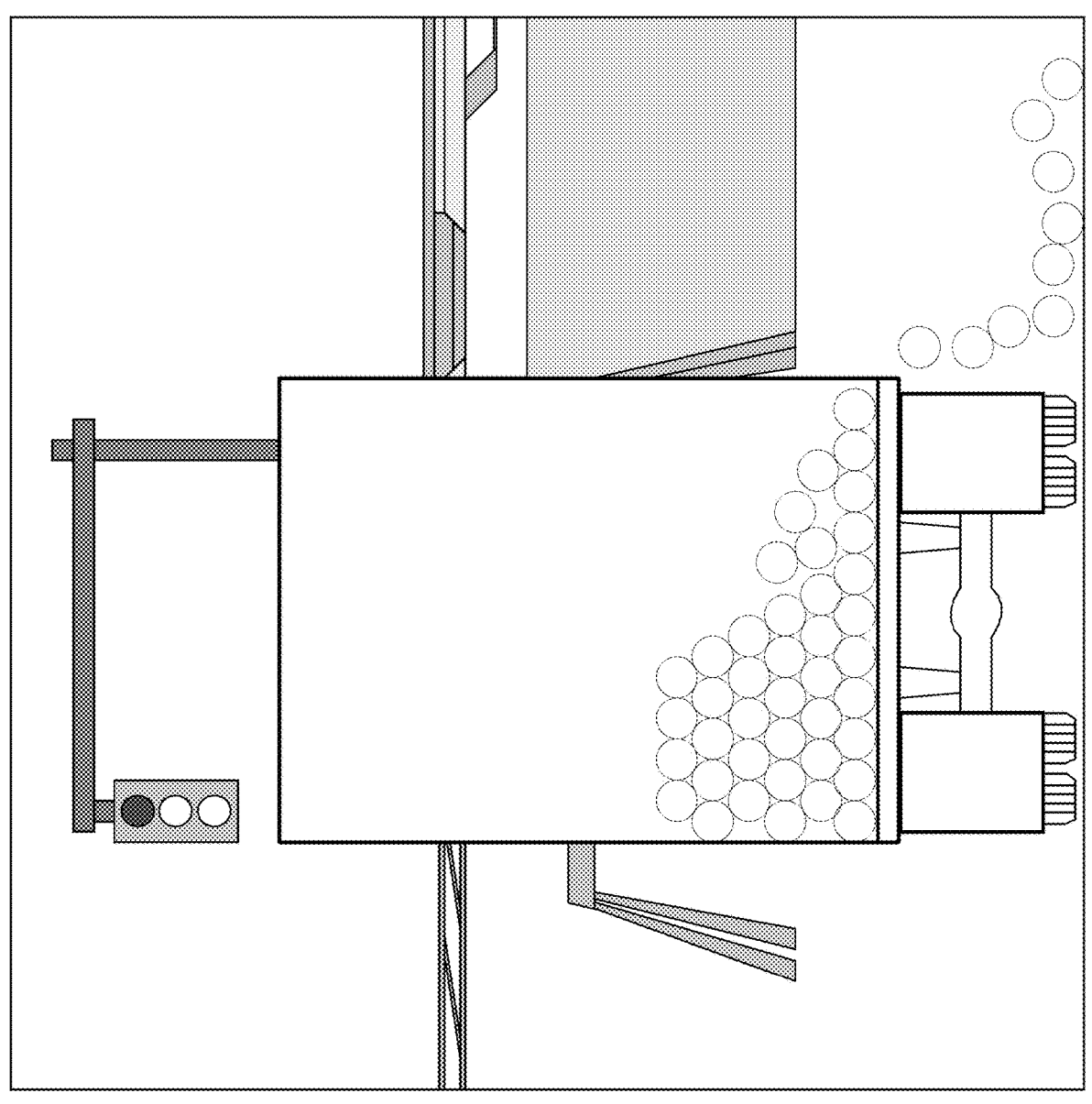

Other scenarios involve cargo displacement. FIGS. 5A-B illustrate an example 500 of cargo falling off of the vehicle. For instance, pipes, logs or other objects may be stacked and retained in place by one or more straps 502 (FIG. 5A). Should the straps fail, some or all of the objects may break free and fall off the vehicle as seen in FIG. 5B. Here, depending on the cargo size, weight, distribution, etc., this could also impact vehicle operation. The falling cargo could cause a shift in the vehicle's pose (particularly the trailer's pose). And once the cargo is gone, the overall mass of the vehicle is decreased. This could decrease both momentum and the friction force of the tires. The overall effect would be that the curvature of the trailer's path would more closely match the tractor's path after cargo loss. Here, the corrective action may include notifying relevant parties (e.g., safety driver, cargo distributor, police, and/or department of public works responsible for the roadway, etc.) about the location of the lost cargo, for instance in addition to pulling over so that remaining cargo may be secured.

Figure 6A:
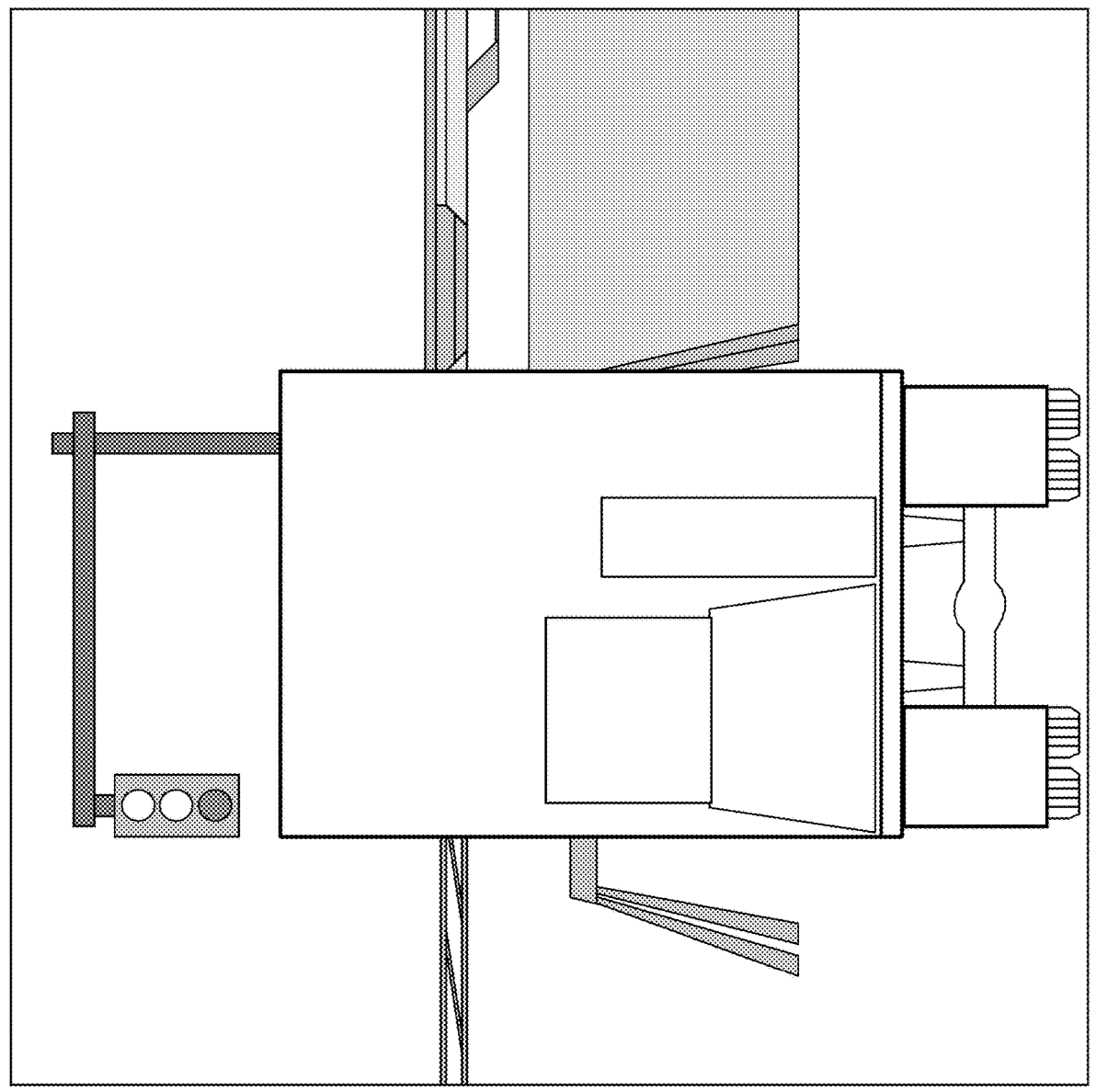
FIGS. 6A-B illustrate an example cargo shifting scenario in accordance with aspects of the technology.
Figure 6B:
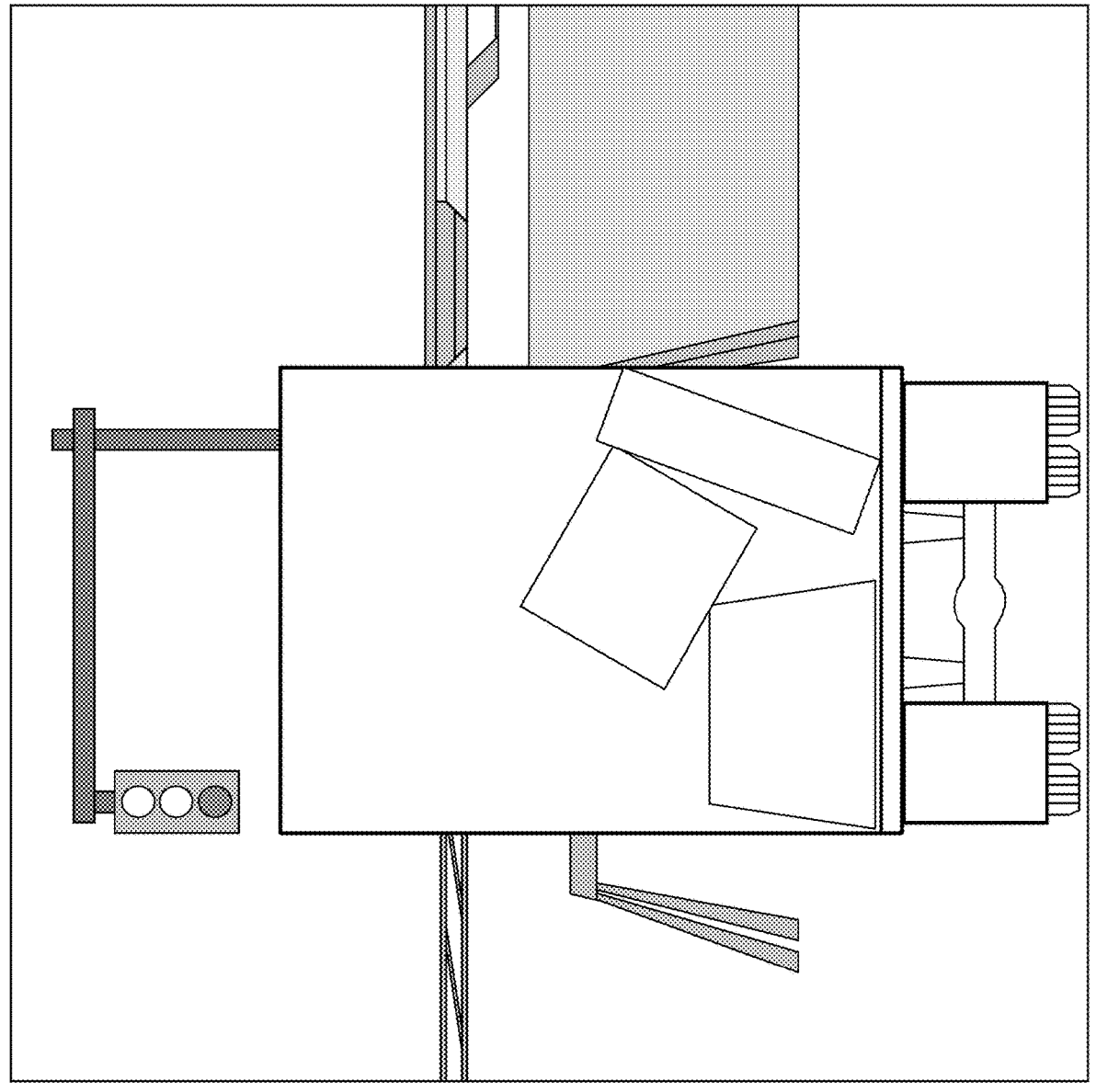

Another displacement situation involves shifting of cargo. Here, cargo might slide forward or backward along the trailer. Alternatively or in addition, it may also shift from one side to another. FIGS. 6A-B illustrate an example 600 of lateral cargo shifting. While the overall mass of the cargo carried by the vehicle would not change, its weight distribution would, and that could affect driving operations. For instance, lateral shifting of the cargo could cause a corresponding lateral shift and/or tilt of the trailer. Cargo shifting backward could increase the friction force of the tires and the moment of inertia. As a result, the curvature of the trailer's path would be more extreme (e.g., causing the trailer to cross a lane line) as compared to the tractor's path. Forward shifting cargo would have the opposite effect. Here, the cargo's center of mass would be shifted closer to the fifth-wheel/kingpin connection, which could be detectable with pressure sensors or other on-board sensors such as a gyroscope.

The on-board computer system could use its knowledge of the current (and planned) driving actions to determine when cargo-shifting is most likely, e.g., based on acceleration, braking or turning in view of the upcoming road configuration and relevant environmental factors (e.g., wet surface, high winds, etc.). The system may select a corrective (or prospective) action based on the type of cargo, severity of the situation or other factors. For instance, if there is a potential for damage to the cargo, an inspection may be added at the next or final stop. And if it is determined that the cargo shift is significant enough to affect fuel economy, the vehicle may take immediate action, e.g., by reducing speed or drafting behind another truck, request that the cargo be redistributed when it is convenient to do so, for instance at a next scheduled refueling or cargo offloading stop, etc.

Figure 7A:
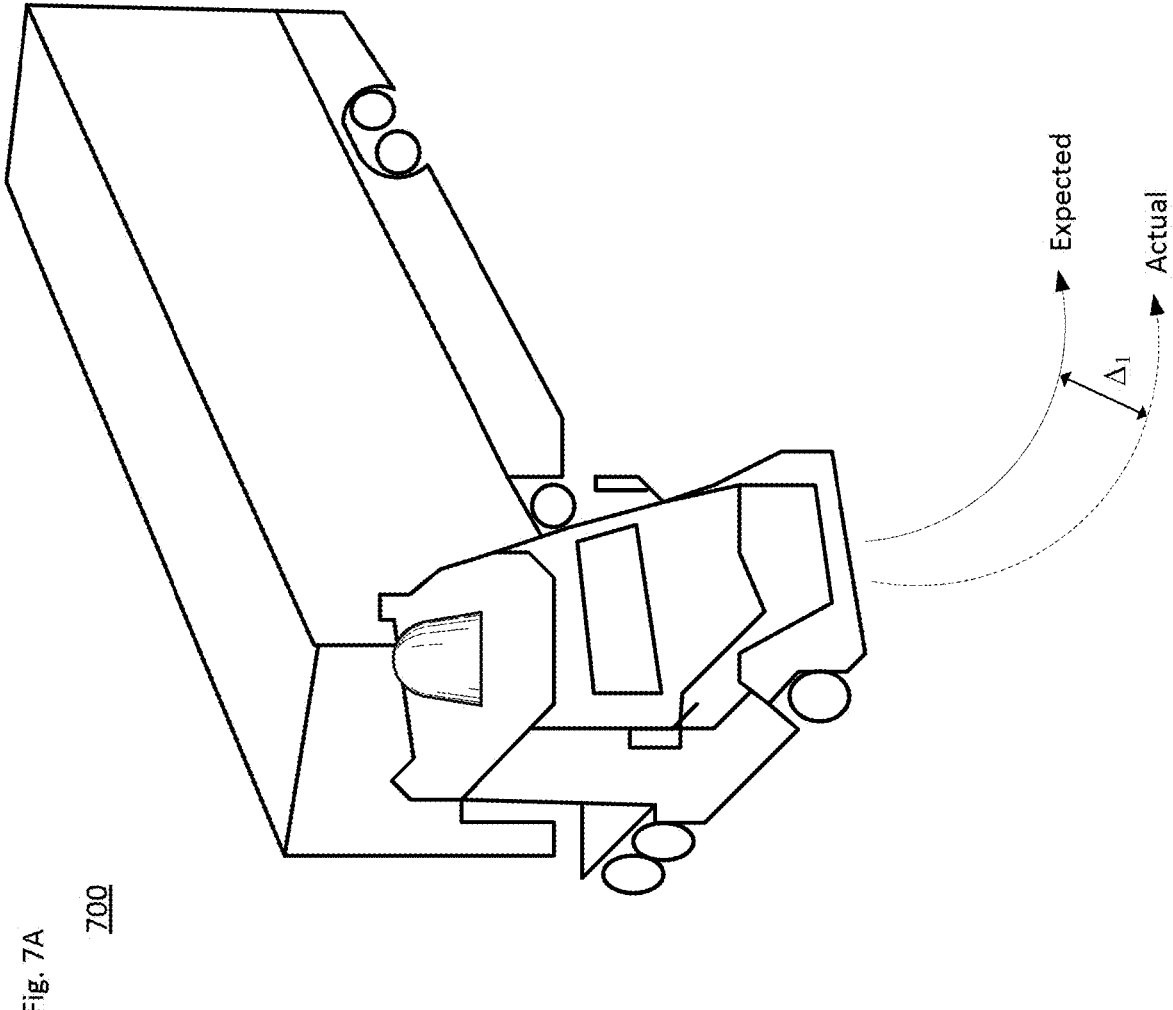
FIGS. 7A-B illustrate examples of positional variance in accordance with aspects of the technology.
Figure 7B:
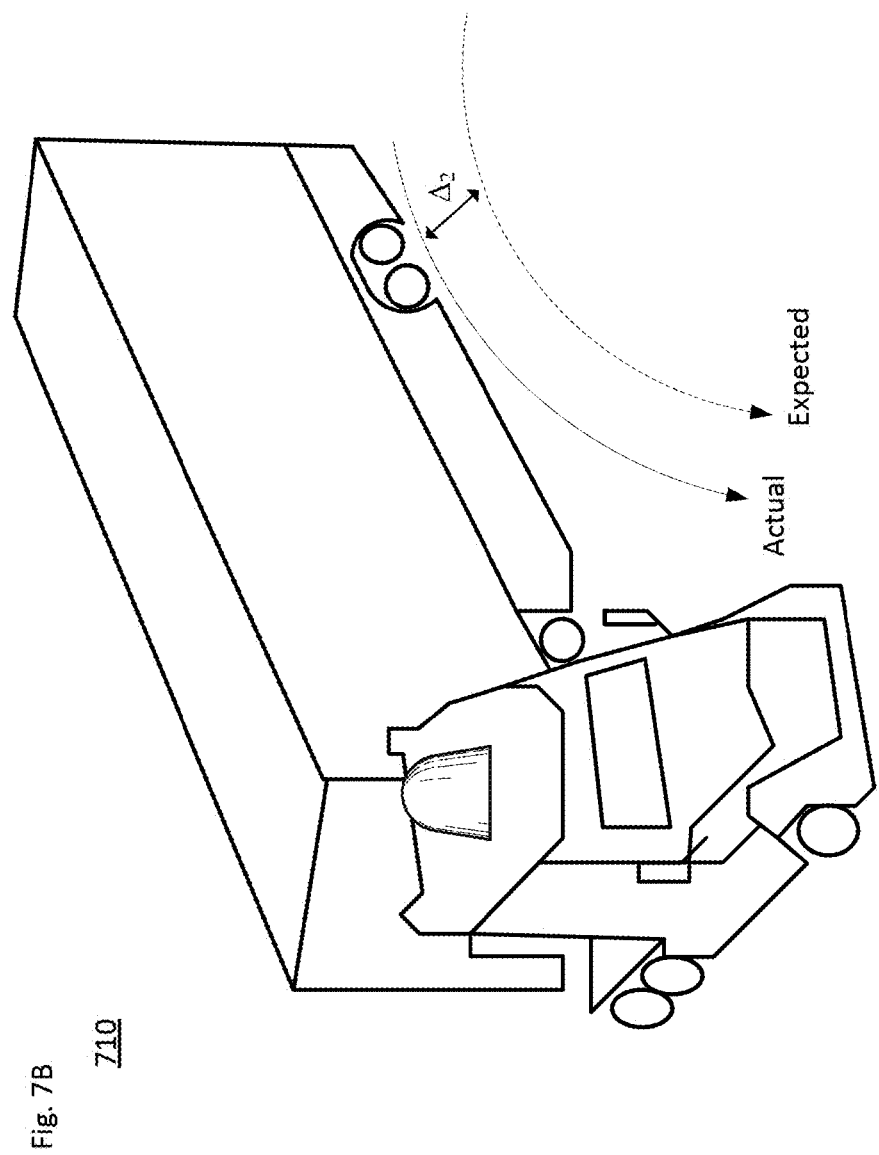

FIGS. 7A and 7B illustrate two examples of a positional variance of the vehicle that may be due to lost or shifting cargo. In example 700 of FIG. 7A, as the vehicle turns the system may expect a relatively tight turning radius. However, due to a problem with the cargo, the actual observed turning radius may be larger, resulting in a deviation $\Delta_1$. In example 710 of FIG. 7B, as the vehicle is driving along the roadway, the system may expect the trailer to move along a first trajectory in line with the tractor. Here, due to the lost or shifted cargo, the actual observed trailer trajectory may be wider or otherwise out of line with the tractor's trajectory, resulting in a deviation $\Delta_2$.

The system may also predict the likelihood of a maneuvering problem along an upcoming section along the route based on received sensor data. Such a prediction may also factor in other information, such as received weather data, measured temperature and/or humidity information, topographical data from on-board maps, etc., as well as how other vehicles have driven through or along a particular stretch of roadway.

Figure 8A:
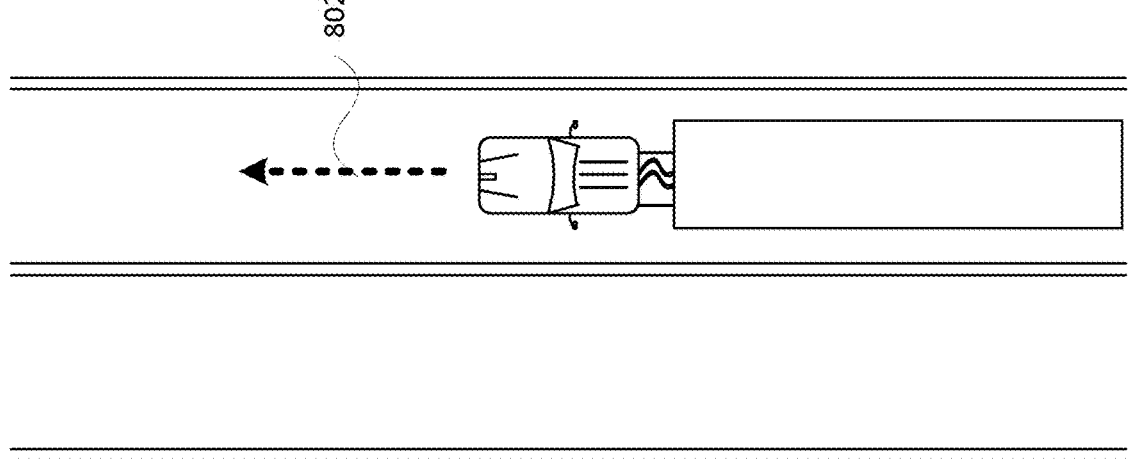
FIGS. 8A-B illustrate an example of route plan modification in accordance with aspects of the technology.
Figure 8B:
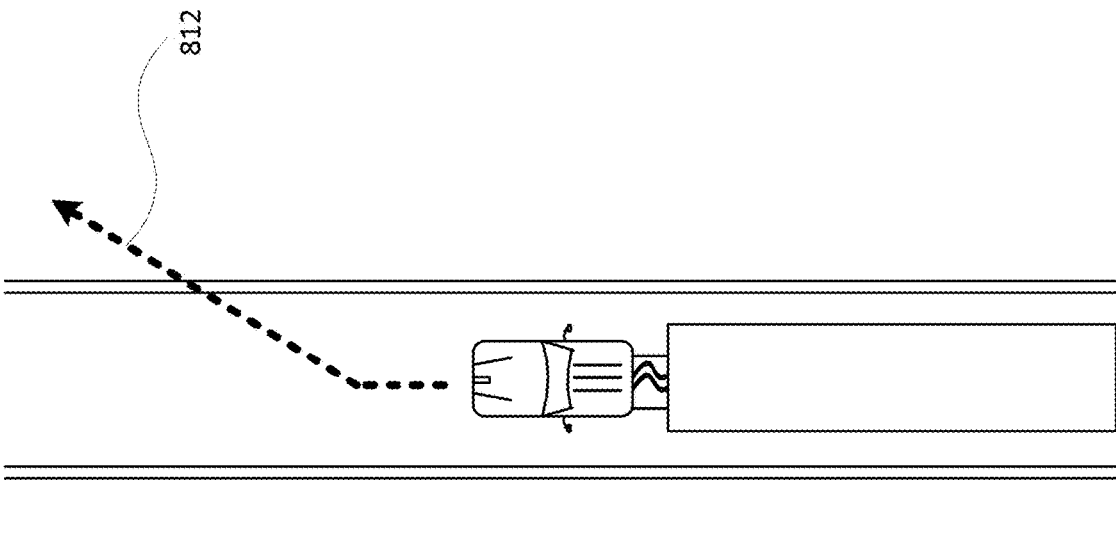

An example of this is illustrated in FIGS. 8A-B. In particular, FIG. 8A illustrates a vehicle such as tractor-trailer 100 of FIG. 1A driving along a lane of a freeway during a first point in time 800. The planner module may have planned for the vehicle to stay in the lane as shown by straight arrow 802. However, in this example, the vehicle's system may determine there is a steep downgrade (e.g., 10° decline or more), and may also determine that there is an anomalous condition of the vehicle that would adversely affect driving at such a steep angle (e.g., cargo shifting). In this case, as shown in FIG. 8B at point in time 810, the planner module alters the path as shown by angled arrow 812, causing the vehicle's driving systems to pull over.

Discrepancies that indicate an anomalous vehicle condition may occur due to deviations from expected position, orientation and/or speed. By way of example only, the system may flag a discrepancy in longitudinal position if there is at least a 10-50 centimeter difference between the actual and expected longitudinal positions. Similarly, the system may flag a discrepancy in lateral position if there is at least a 5-30 centimeter difference between the actual and expected lateral positions. In another example, if the orientation of the vehicle (either tractor or trailer) is off by more than about 1-5 degrees, this may indicate an orientation discrepancy. And in a further example, if the speed differs by more than about 1-3 m/s, this may also be flagged as a discrepancy associated with an anomalous condition. Such discrepancy values and ranges are merely exemplary and may be higher or lower.

The results of such determinations may be fed back to the planner module or another part of the vehicle's control system and can be used in various ways. For instance, depending on the type of anomalous condition, the system may adjust the amount of allowable deceleration (or acceleration) used in trajectory generation along a given portion of the route. If cars or other objects are detected (e.g., via lidar, radar, cameras or other sensors) ahead of or behind the vehicle, additional headway may be incorporated into the driving plan. Pre-emptive braking may also be performed to avoid a potential collision situation. The braking profile and/or a desired stopping point can also be selected according to the above information.

Other aspects of the system may involve immediate corrective action and route re-planning. The immediate corrective action may include short or long duration braking. And the planner module may make adjustments to the route to avoid or minimize the possibility of skidding or jackknifing. For instance, the vehicle may change lanes or pull over as shown in FIG. 8B, or may take an alternative route that avoids upcoming hilly or curved portions of the roadway. In other examples, route re-planning may include taking a closer or farther exit on the freeway, changing the destination location (e.g., a drop-off point), etc. Still further, the vehicle can drive more slowly, such as 5-10 mph or more below a posted speed, to better address the anomalous condition. In yet another example, knowing which tires are flat or underpressurized would help in maneuver planning. Here, the control system (e.g., planner module) could instruct the steering system to make adjustments so that the vehicle moves in a manner that minimizes the impact of the damaged or underpressurized tire.

Figure 9A:
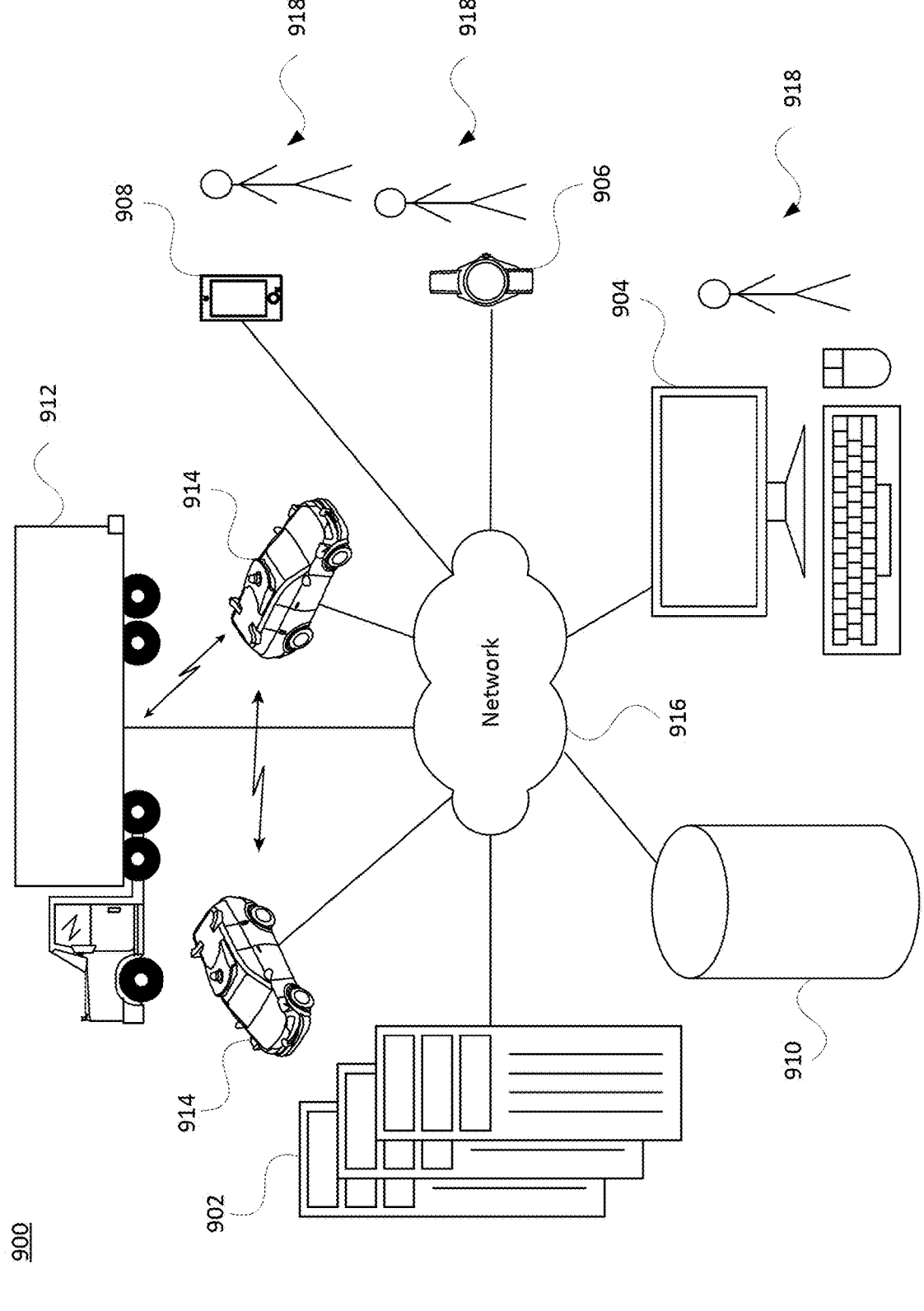
FIGS. 9A-B illustrates an example system in accordance with aspects of the technology.
Figure 9B:
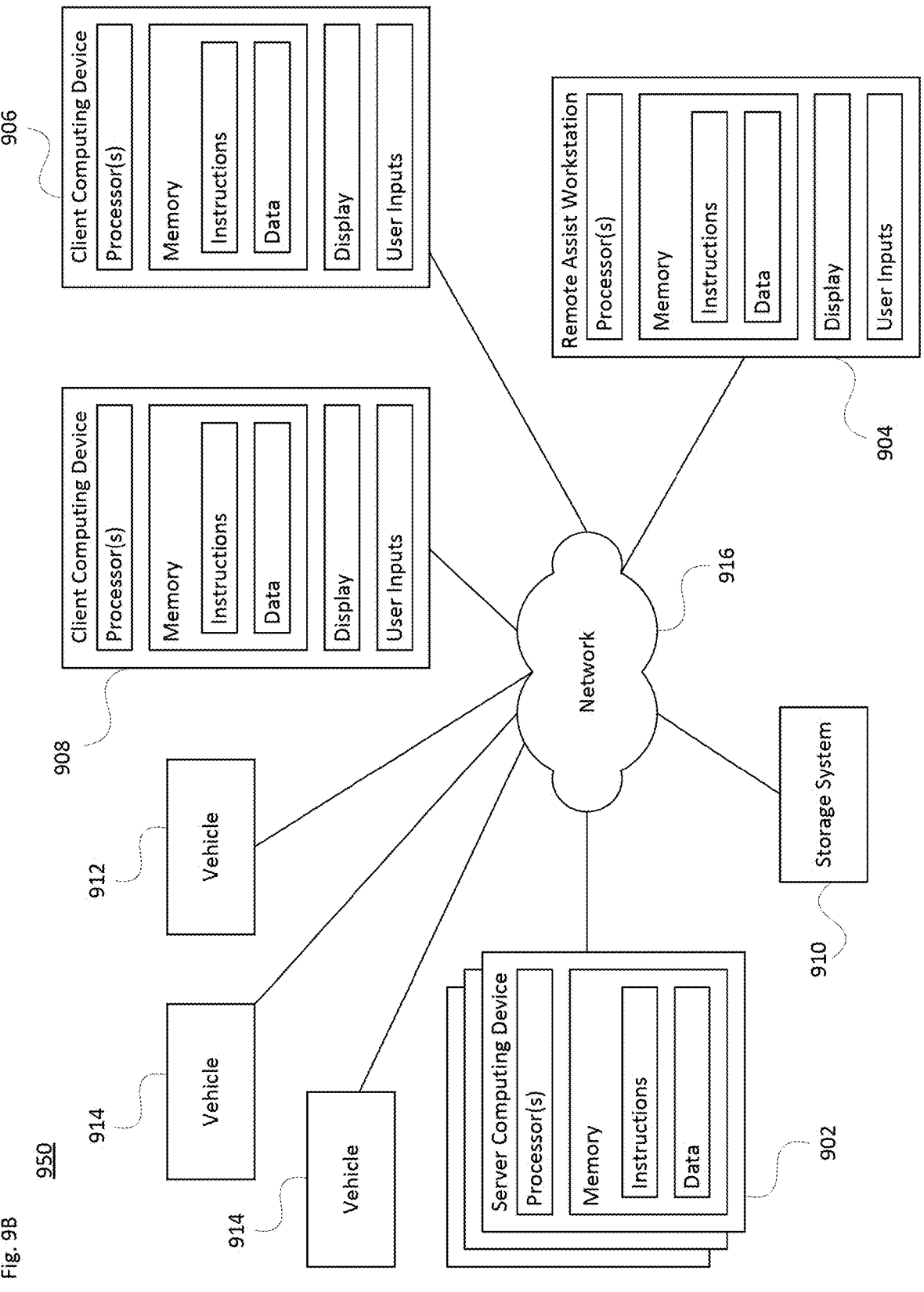

In addition to using the anomalous condition information for operation of the vehicle, this information may also be shared with other vehicles, such as vehicles that are part of a fleet. One example of this is shown in FIGS. 9A and 9B. In particular, FIG. 9A is a pictorial diagram 900 and FIG. 9B is a functional diagram 950 of an example system that includes a plurality of computing devices 902, 904, 906, 908 and a storage system 910 connected via a network 916. The system also includes vehicles 912 and 914, which may be configured the same as or similarly to vehicle 100 of FIGS. 1A-B. Vehicles 912 and/or vehicles 914 may be part of a fleet of vehicles. Although only a few vehicles and computing devices are depicted for simplicity, a typical system may include significantly more.

As shown in FIG. 9B, each of computing devices 902, 904, 906 and 908 may include one or more processors, memory, data and instructions. Such processors, memories, data and instructions may be configured similarly to the ones described above with regard to FIG. 2A.

The various computing devices and vehicles may communication via one or more networks, such as network 916. The network 916, and intervening nodes, may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 902 may include one or more server computing devices having a plurality of computing devices, e.g., a load balanced server farm, that exchange information with different nodes of a network for the purpose of receiving, processing and transmitting the data to and from other computing devices. For instance, computing device 902 may include one or more server computing devices that are capable of communicating with the computing devices of vehicles 912 and/or 914, as well as computing devices 904, 906 and 908 via the network 916. For example, vehicles 912 and/or 914 may be a part of a fleet of vehicles that can be dispatched by a server computing device to various locations. In this regard, the computing device 902 may function as a dispatching server computing system which can be used to dispatch vehicles to different locations in order to pick up and deliver cargo or pick up and drop off passengers. In addition, server computing device 902 may use network 916 to transmit and present information to a user of one of the other computing devices or a passenger of a vehicle. In this regard, computing devices 904, 906 and 908 may be considered client computing devices.

As shown in FIG. 9A each client computing device 904, 906 and 908 may be a personal computing device intended for use by a respective user 918, and have all of the components normally used in connection with a personal computing device including a one or more processors (e.g., a central processing unit (CPU)), memory (e.g., RAM and internal hard drives) storing data and instructions, a display (e.g., a monitor having a screen, a touch-screen, a projector, a television, or other device such as a smart watch display that is operable to display information), and user input devices (e.g., a mouse, keyboard, touchscreen or microphone). The client computing devices may also include a camera for recording video streams, speakers, a network interface device, and all of the components used for connecting these elements to one another.

Although the client computing devices may each comprise a full-sized personal computing device, they may alternatively comprise mobile computing devices capable of wirelessly exchanging data with a server over a network such as the Internet. By way of example only, client computing devices 906 and 908 may be mobile phones or devices such as a wireless-enabled PDA, a tablet PC, a wearable computing device (e.g., a smartwatch), or a netbook that is capable of obtaining information via the Internet or other networks.

In some examples, client computing device 904 may be a remote assistance workstation used by an administrator or operator to communicate with passengers of dispatched vehicles. Although only a single remote assistance workstation 904 is shown in FIGS. 9A-9B, any number of such work stations may be included in a given system. Moreover, although operations work station is depicted as a desktop-type computer, operations works stations may include various types of personal computing devices such as laptops, netbooks, tablet computers, etc.

Storage system 910 can be of any type of computerized storage capable of storing information accessible by the server computing devices 1202, such as a hard-drive, memory card, ROM, RAM, DVD, CD-ROM, flash drive and/or tape drive. In addition, storage system 910 may include a distributed storage system where data is stored on a plurality of different storage devices which may be physically located at the same or different geographic locations. Storage system 910 may be connected to the computing devices via the network 916 as shown in FIGS. 9A-B, and/or may be directly connected to or incorporated into any of the computing devices.

Storage system 910 may store various types of information. For instance, the storage system 910 may also store autonomous vehicle control software which is to be used by vehicles, such as vehicles 912 or 914, to operate such vehicles in an autonomous driving mode. It may store vehicle model information for each type of vehicle in the fleet. Storage system 910 may also store map information, route information, weather information, etc. This information may be shared with the vehicles 912 and 914, for instance to help with real-time route planning and traction analysis by the on-board computer system(s). The remote assistance workstation 904 may access the stored information and use it to assist operation of a single vehicle or a fleet of vehicles. By way of example, a lead vehicle may detect an anomalous condition of itself or of another vehicle and send information about the condition to the remote assistance workstation 904. In turn, the remote assistance workstation 904 may disseminate the information to other vehicles in the fleet, so that they may alter their routes or take other corrective action.

In a situation where there is a passenger or remote assistance personnel (e.g., a safety driver), the vehicle or remote assistance workstation may communicate directly or indirectly with the person's client computing device. Here, for example, information may be provided to the passenger or remote assistance personnel regarding current driving operations, changes to the route in response to the situation, etc. The passenger or remote assistance personnel may then provide instructions to the vehicle and/or take over some or all of the driving operations.

FIG. 10 illustrates an example method of operation 1000 in accordance with the above discussions. For instance, at block 1002 one or more processors of the vehicle determine an expected pose of the vehicle based on a model of the vehicle. The vehicle model may be a kinematic model stored in on-board memory. Alternatively, the model may be stored remotely, e.g., at a server of a remote assistance service.

At block 1004, one or more sensors of a perception system of the vehicle obtain sensor data during operation in the autonomous driving mode. The sensor data indicates at least one of (i) objects in an environment surrounding the vehicle or (ii) vehicle-specific information. By way of example, the vehicle-specific information may include pose information, acoustical information indicating a tire status, and/or pressure information indicating at least one of instantaneous tire pressure or cargo load distribution.

At block 1006, the sensor data obtained by the perception system is received by the one or more processors. At block 1008, the one or more processors direct a driving system of the vehicle based on the received sensor data. At block 1010, an actual pose of the vehicle is determined according to the received sensor data.

At block 1012, the actual pose is compared with the expected pose. At block 1014, based on the compared actual and expected poses, the one or more processors detect a pose discrepancy. For instance, the discrepancy may reflect a variance (delta) in a relative distance to another object, in an orientation (e.g., yaw), a direction of travel, etc. At block 1016, the one or more processors determine an anomalous condition of the vehicle based on the detected pose discrepancy.

In one example, the variance may need to exceed a threshold value before the system determines that there is an anomalous condition. In this case, the threshold value may be, e.g., a percentage deviation from an expected baseline (e.g., 2-5% or more or less), a physical distance or angular delta (e.g., greater than 5-20 centimeters or exceeding 1-5°), or some other factor. Thus, one way the anomalous condition can be determined is by the variance exceeding a threshold value. The variance can also be used in other ways, such as in a lookup table with different values correlating to particular anomalous conditions. Other aspects may employ a heuristic or machine learning approach or other model to determine that an anomalous condition has occurred. Then, at block 1018, a corrective action is effected in response to the anomalous condition.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements. The processes or other operations may be performed in a different order or simultaneously, unless expressly indicated otherwise herein.

The invention claimed is:

1. A vehicle configured to operate in an autonomous driving mode, comprising:

memory including a vehicle model stored therein, the vehicle model being calibrated to account for at least one real-world condition or driving situation;

a driving system including a steering subsystem, an acceleration subsystem and a deceleration subsystem to control driving of the vehicle in the autonomous driving mode;

a perception system including one or more sensors, each sensor being positioned along the vehicle and configured to detect objects in an environment around the vehicle, the one or more sensors including at least one of a lidar sensor, a camera sensor or a radar sensor; and a control system operatively connected to the driving system and the perception system, the control system having one or more computer processors configured to:

receive sensor data from the one or more sensors of the perception system while operating in the autonomous driving mode;

identify an actual pose of the vehicle along a roadway at a particular point in time based upon the received sensor data;

determine, using the vehicle model, a predicted pose of the vehicle at the particular point in time;

determine that there is an anomalous condition of the vehicle upon identification of a discrepancy between the actual pose of the vehicle along the roadway at the particular point in time and the predicted pose of the vehicle along the roadway at the particular point in time; and effect a corrective action in response to the anomalous condition.

2. The vehicle of claim 1, wherein identification of the discrepancy includes a determination that there is a deviation from the predicted pose beyond a threshold deviation amount.

3. The vehicle of claim 2, wherein determination of the deviation from the predicted pose beyond the threshold deviation amount includes an evaluation of whether the deviation from the predicted pose persists over a given time interval.

4. The vehicle of claim 1, wherein identification of the discrepancy includes an evaluation of an amount of the discrepancy based on a current environmental condition.

5. The vehicle of claim 1, wherein identification of the discrepancy includes an evaluation of an accuracy of the actual pose.

6. The vehicle of claim 1, wherein identification of the discrepancy includes an evaluation of a cost factor associated with the corrective action.

7. The vehicle of claim 6, wherein the corrective action is deferred based on the evaluation until the vehicle reaches a specific location.

8. The vehicle of claim 1, wherein identification of the discrepancy includes an evaluation of whether a road condition is transient.

9. The vehicle of claim 1, wherein the vehicle model is a kinematic model.

10. The vehicle of claim 1, wherein the vehicle model includes a set of heuristics, the set of heuristics being associated with a history of other vehicles that operated along the roadway.

11. The vehicle of claim 1, wherein the vehicle model is a machine learning model, the machine learning model being trained to identify one or more types of anomalous conditions.

12. The vehicle of claim 1, wherein the anomalous condition is either a shift in cargo or a loss of cargo.

13. The vehicle of claim 1, wherein the anomalous condition is either a flat tire condition or a component mechanical failure.

14. The vehicle of claim 1, wherein the control system is configured to effect the corrective action in accordance with a type of cargo.

15. The vehicle of claim 1, further comprising:

a trailer; and tractor including a coupling system configured to adjustably couple to the trailer.

16. A method of operating a vehicle in an autonomous driving mode, the method comprising:

receiving, by one or more processors of a control system of the vehicle, sensor data from a perception system while operating in the autonomous driving mode;

identifying, by the one or more processors, an actual pose of the vehicle along a roadway at a particular point in time based upon the received sensor data;

determining, by the one or more processors using a vehicle model stored in memory, a predicted pose of the vehicle at the particular point in time, the vehicle model being calibrated to account for at least one real-world condition or driving situation;

determining, by the one or more processors, that there is an anomalous condition of the vehicle upon identifying a discrepancy between the actual pose of the vehicle along the roadway at the particular point in time and the predicted pose of the vehicle along the roadway at the particular point in time; and effecting, by the one or more processors, a corrective action in response to the anomalous condition.

17. The method of claim 16, wherein the corrective action is a real-time corrective driving action.

18. The method of claim 16, wherein the corrective action includes at least one of modifying a planned route for the vehicle, alerting a remote operations center to the anomalous condition, or communicating with another vehicle regarding the anomalous condition.

19. The method of claim 16, wherein identifying the discrepancy includes a determination that there is a deviation from the predicted pose beyond a threshold deviation amount.

20. The method of claim 16, wherein identifying the discrepancy includes at least one of:

evaluating an amount of the discrepancy based on a current environmental condition;

evaluating an accuracy of the actual pose; or evaluating a cost factor associated with the corrective action.

21. The vehicle of claim 15, wherein the at least one real-world condition or driving situation is associated with a positional relationship of the tractor and the trailer.

22. The method of claim 16, wherein the at least one real-world condition or driving situation is associated with a positional relationship of a tractor and a trailer of the vehicle.

* * * * *